(12) United States Patent
Offengenden et al.

(10) Patent No.: US 11,833,689 B2
(45) Date of Patent: Dec. 5, 2023

(54) PORTABLE REHABILITATION APPARATUS

(71) Applicant: Bionik, Inc., Watertown, MA (US)

(72) Inventors: Evgeny Offengenden, Toronto (CA); Stephen Donald Sharp, Toronto (CA); Sagar Saxena, Toronto (CA); Bavly Maged Youakim Fahmy, Toronto (CA); Mehmet Fatih Yuzbasioglu, Toronto (CA)

(73) Assignee: Bionik, Inc., Watertown, MA (US)

( * ) Notice: Subject to any disclaimer, the term of this patent is extended or adjusted under 35 U.S.C. 154(b) by 699 days.

(21) Appl. No.: 16/997,145

(22) Filed: Aug. 19, 2020

(65) Prior Publication Data

US 2021/0053222 A1 Feb. 25, 2021

Related U.S. Application Data

(60) Provisional application No. 62/888,807, filed on Aug. 19, 2019.

(51) Int. Cl.
| | |
|---|---|
| *B25J 11/00* | (2006.01) |
| *B25J 9/16* | (2006.01) |
| *A61H 1/02* | (2006.01) |
| *A61G 12/00* | (2006.01) |
| *B25J 5/00* | (2006.01) |

(52) U.S. Cl.
CPC .......... *B25J 9/1664* (2013.01); *A61G 12/001* (2013.01); *A61H 1/0285* (2013.01); *B25J 5/007* (2013.01); *B25J 11/00* (2013.01); *A61H 2201/0157* (2013.01); *A61H 2201/1635* (2013.01); *A61H 2201/1659* (2013.01); *A61H 2201/5043* (2013.01)

(58) Field of Classification Search
CPC .......... B25J 9/1664; B25J 5/007; B25J 11/00; A61G 12/001; A61H 1/0285; A61H 2201/0157; A61H 2201/1635; A61H 2201/1659; A61H 2201/5043
USPC .......................................................... 180/20
See application file for complete search history.

(56) References Cited

U.S. PATENT DOCUMENTS

| | | | |
|---|---|---|---|
| 8,714,569 B2* | 5/2014 | Lu .............................. | B62B 3/02 280/35 |
| 9,039,016 B2* | 5/2015 | Abernethy ............. | F16M 11/18 361/679.01 |
| 9,451,931 B2* | 9/2016 | Ninomiya ............ | A61B 8/4411 |

(Continued)

*Primary Examiner* — James A Shriver, II
*Assistant Examiner* — Hilary L Johns
(74) *Attorney, Agent, or Firm* — Forsgren Fisher; James M. Urzedowski; Daniel A. Tysver

(57) ABSTRACT

Disclosed is a portable rehabilitation apparatus and method for use of the apparatus by a user or patient. The apparatus is adapted for transitioning between a collapsed state to facilitate the mobility of the rehabilitation robot (e.g., using wheels) and an open state for operation of the rehabilitation robot by the user. The apparatus includes the rehabilitation robot that is contained within a compartment defined by a housing which is made up of moveable portions. The apparatus also includes a mast assembly adapted to form a gap between the moveable housing portions in order to provide the user with access to the rehabilitation robot. The mast assembly is further adapted to collapse, thereby eliminating the gap and closing off the compartment when the rehabilitation robot is not in use.

22 Claims, 24 Drawing Sheets

(56) References Cited

U.S. PATENT DOCUMENTS

| | | | | |
|---|---|---|---|---|
| 9,475,514 | B2* | 10/2016 | Hardy | A61G 12/001 |
| 11,345,052 | B1* | 5/2022 | Johnston | B25J 18/025 |
| 11,383,394 | B1* | 7/2022 | Glusker | B25J 18/04 |
| 11,446,810 | B1* | 9/2022 | Chua | B25J 19/023 |
| 2007/0228680 | A1* | 10/2007 | Reppert | A61G 12/001 |
| | | | | 280/47.35 |
| 2011/0224544 | A1* | 9/2011 | Ahn | A61B 8/4405 |
| | | | | 600/437 |
| 2019/0043621 | A1* | 2/2019 | Celmins | H04N 23/50 |
| 2020/0206946 | A1* | 7/2020 | Bondaryk | B66F 9/20 |
| 2021/0053222 | A1* | 2/2021 | Offengenden | A61G 12/001 |
| 2021/0267707 | A1* | 9/2021 | Sung | G06F 3/016 |

* cited by examiner

PORTABLE REHABILITATION APPARATUS

FIELD OF THE INVENTION

The present invention relates generally to a rehabilitation apparatus and method, and more particularly to a portable or mobile rehabilitation apparatus and method.

BACKGROUND OF THE INVENTION

People who have arm and hand impairment caused by a medical issue (e.g., stroke) are typically treated using machines that train the arm and hand. Current machines in the prior art are typically bulky and/or immovable and are therefore usually required to be in a fixed location (e.g., a clinic, hospital, etc.). Patients who are immobile due to physical limitations or transportation issues may have difficulty accessing treatment which may negatively impact the quality and efficacy of therapy.

Accordingly, there is a need for a portable or mobile rehabilitation apparatus solution. What may be needed is an apparatus that overcomes one or more of the limitations associated with the prior art.

SUMMARY OF THE INVENTION

According to an embodiment of the invention, there is provided a portable rehabilitation apparatus adapted for transitioning between a collapsed state to facilitate the mobility of the apparatus (e.g., to a patient's home) and an extended state for operation of the rehabilitation apparatus by a user. Previous designs require the patient to attend the at the location of the facility housing the rehabilitate unit (e.g., a clinic, hospital, etc.).

According to a preferred embodiment of the invention, there is provided a mobile rehabilitation apparatus for providing therapy to a user. The apparatus preferably includes a base having one or more wheels. A mast assembly is also preferably included, projecting from the base, including a lower mast portion and an upper mast portion moveable relative to the lower mast portion, between a raised position and a collapsed position. A rehabilitation robot is preferably included in the apparatus. A linkage is also preferably associated with the upper mast portion and adapted for mounting the rehabilitation robot. Preferably, a housing is provided including a lower housing portion supported by the base and an upper housing portion supported by the upper mast portion, the lower housing portion having a compartment defined therein sized to accommodate the rehabilitation robot and the linkage when the robot is not in use. The upper housing portion is preferably moveable relative to the lower housing portion between a stowage position wherein the upper housing portion rests proximate to the lower housing portion, and a deployment position wherein the upper housing portion is spaced apart from the lower housing portion. The mast assembly and the housing are preferably configured to cooperate with each other such that: when the upper mast portion is in the raised position, the upper housing portion occupies the deployment position thereby forming a gap between the upper housing portion and the lower housing portion; the gap providing the user with access to the rehabilitation robot and permitting deployment of the rehabilitation robot; and when the upper mast portion is in the collapsed position, the upper housing portion occupies the stowage position thereby eliminating the gap closing off the compartment accommodating the rehabilitation robot and linkage.

According to an aspect of a preferred embodiment of the invention, the linkage of the mobile rehabilitation apparatus is moveable between a retracted position and an extended position, such that the linkage is wholly contained within the compartment in the retracted position and extends beyond the boundary of the compartment in the extended position.

According to an aspect of a preferred embodiment of the invention, the movement of the linkage is perpendicular to the displacement of the upper housing portion.

According to an aspect of a preferred embodiment of the invention, the linkage is a scissor mechanism.

According to an aspect of a preferred embodiment of the invention, the linkage is motorized.

According to an aspect of a preferred embodiment of the invention, the linkage includes two motors positioned in a vertical arrangement.

According to an aspect of a preferred embodiment of the invention, the two motors are supported by the upper mast portion using a cantilevered arrangement.

According to an aspect of a preferred embodiment of the invention, the linkage includes two motors positioned in a horizontal arrangement.

According to an aspect of a preferred embodiment of the invention, the two motors are supported on a bottom surface by a platform extending from the upper mast portion.

According to an aspect of a preferred embodiment of the invention, the base further includes a support extending away from a lower surface to maintain the apparatus in an upright position during use of the rehabilitation robot by the user.

According to an aspect of a preferred embodiment of the invention, the upper mast portion is received within the lower mast portion in the collapsed position.

According to an aspect of a preferred embodiment of the invention, the lower mast portion is received within the upper mast portion in the collapsed position.

According to an aspect of a preferred embodiment of the invention, the lower housing portion further includes a stabilizer having a proximal portion and a distal portion, the proximal portion pivotally connected to the lower housing portion and the distal portion adapted to engage a surface when the rehabilitation robot is deployed to maintain the apparatus in an upright position during use of the rehabilitation robot by the user.

According to an aspect of a preferred embodiment of the invention, the stabilizer further includes a switch operable to automatically induce a displacement of the upper mast portion, such that when the distal portion of the stabilizer engages the surface, the upper mast portion moves to the raised position and when the distal portion is disengaged from the surface, the upper mast portion moves to the collapsed position.

According to an aspect of a preferred embodiment of the invention, the upper housing portion further includes a carry handle to facilitate transit of the apparatus when the upper mast portion is in the collapsed position.

According to an aspect of a preferred embodiment of the invention, a tilt bar projecting from the base is provided, on a side of the apparatus proximal to the carry handle, to facilitate movement of the apparatus between an upright position and a tilted position for transit.

According to an aspect of a preferred embodiment of the invention, the height of the upper mast portion in the raised position is adjustable depending on the height of the user.

According to an aspect of a preferred embodiment of the invention, a monitor is provided for use by the user during deployment of the rehabilitation robot, the monitor attached to the upper housing portion by an articulated arm moveable between a monitor in-use position and a monitor stowage position.

According to an aspect of a preferred embodiment of the invention, a top surface of the upper housing portion defines a monitor compartment sized to accommodate the monitor and the articulated arm when the monitor is in the stowage position.

According to an aspect of a preferred embodiment of the invention, the mast assembly further includes a motor to move the upper mast portion relative to the lower mast portion.

In accordance with a preferred embodiment, there is provided a mobile rehabilitation apparatus for providing therapy to a user. The apparatus preferably includes a base and a mast assembly, projecting from the base, the mast assembly including a lower mast portion and an upper mast portion moveable relative to the lower mast portion, between a raised position and a collapsed position. A rehabilitation robot is preferably connected to the upper mast portion. A housing preferably includes a lower housing portion supported by the base and an upper housing portion supported by the upper mast portion, the lower housing portion having a compartment defined therein sized to accommodate the rehabilitation robot when the robot is not in use; the upper housing portion being moveable relative to the lower housing portion between a stowage position wherein the upper housing portion rests proximate to the lower housing portion, and a deployment position wherein the upper housing portion is spaced apart from the lower housing portion. Preferably, the mast assembly and the housing are configured to cooperate with each other such that: when the upper mast portion is in the raised position, the upper housing portion occupies the deployment position thereby forming a gap between the upper housing portion and the lower housing portion; the gap providing the user with access to the rehabilitation robot and permitting deployment of the rehabilitation robot; and when the upper mast portion is in the collapsed position, the upper housing portion occupies the stowage position thereby eliminating the gap closing off the compartment accommodating the rehabilitation robot.

In accordance with a preferred embodiment of the invention, there is provided a method of providing therapy to a patient at a patient location using a mobile rehabilitation apparatus. The method includes a step of providing an apparatus having: a base; a mast assembly, projecting from the base, comprising a lower mast portion and an upper mast portion moveable relative to the lower mast portion, between a raised position and a collapsed position; a rehabilitation robot connected to the upper mast portion; a housing including a lower hosing portion supported by the base and an upper housing portion supported by the upper mast portion, the lower housing portion having a compartment defined therein sized to accommodate the rehabilitation robot when the robot is not in use; the upper housing portion being moveable relative to the lower housing portion between a stowage position wherein the upper housing portion rests proximate to the lower housing portion, and a deployment position wherein the upper housing portion is spaced apart from the lower housing portion. The method also includes a step of moving the apparatus, in the stowage position, to the patient location. The upper mast portion is moved to the raised position to form a gap between the upper housing portion and the lower housing portion, the gap providing the patient with access to the rehabilitation robot and permitting deployment of the rehabilitation robot. Therapy is then provided to the patient using the rehabilitation robot. The upper mast portion is moved to the collapsed position to eliminate the gap closing off the compartment accommodating the rehabilitation robot. The apparatus, in the stowage position, is moved away from the patient location.

Other advantages, features and characteristics of the present invention, as well as methods of operation and functions of the related elements of the apparatus, and the combination of steps, parts and economies of manufacture, will become more apparent upon consideration of the following detailed description and the appended claims with reference to the accompanying drawings, the latter of which are briefly described herein below.

BRIEF DESCRIPTION OF THE DRAWINGS

The novel features which are believed to be characteristic of the apparatus according to the present invention, as to their structure, organization, use, and method of operation, together with further objectives and advantages thereof, will be better understood from the following drawings in which presently preferred embodiments of the invention will now be illustrated by way of example. It is expressly understood, however, that the drawings are for the purpose of illustration and description only, and are not intended as a definition of the limits of the invention.

BRIEF DESCRIPTION OF THE SEVERAL VIEWS OF THE DRAWINGS

Figure 1A:
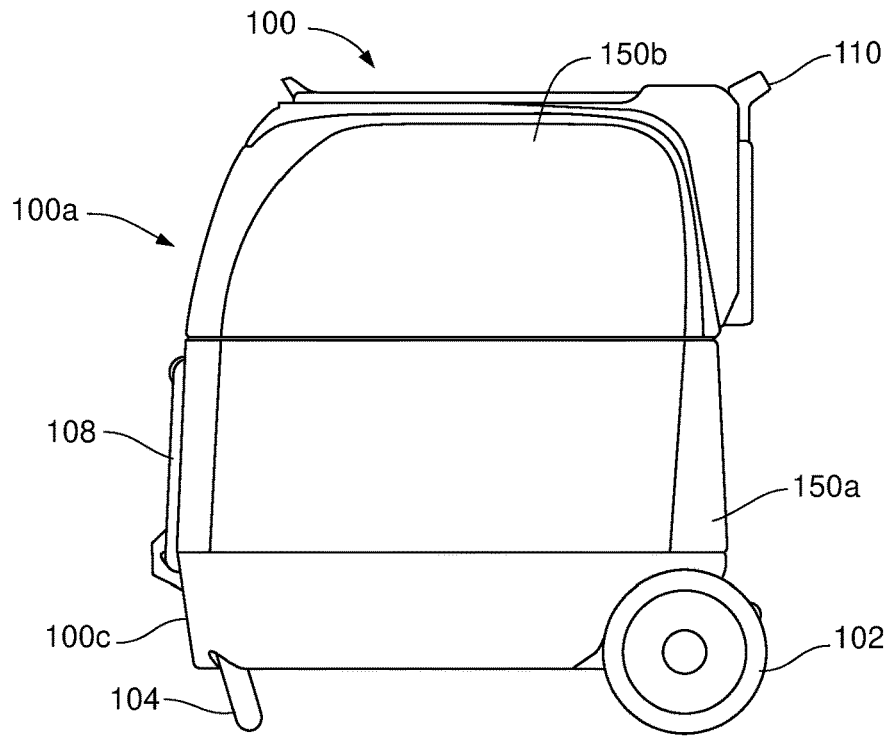
Figure 1B:
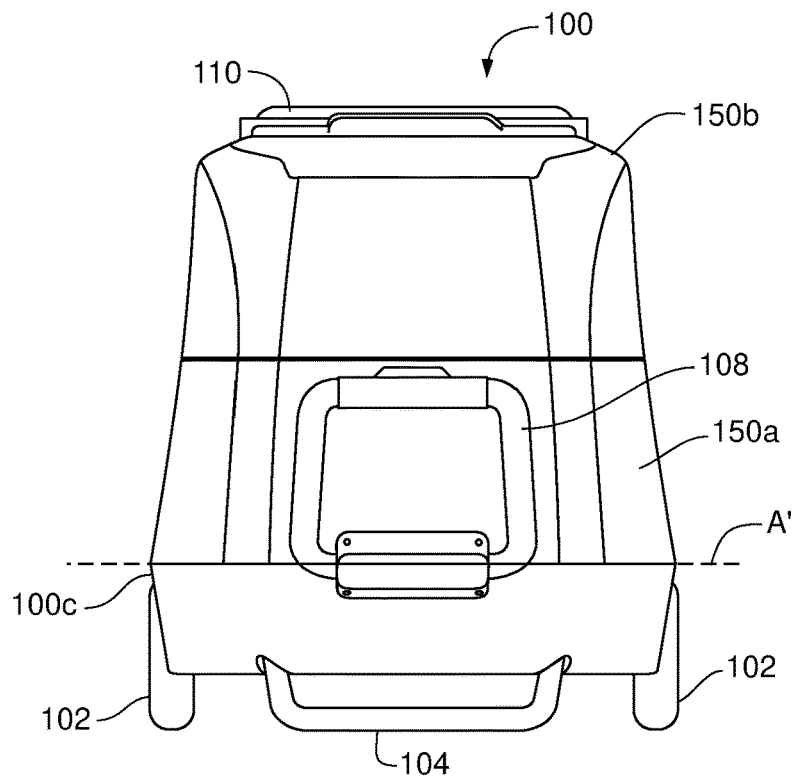
Figure 1C:
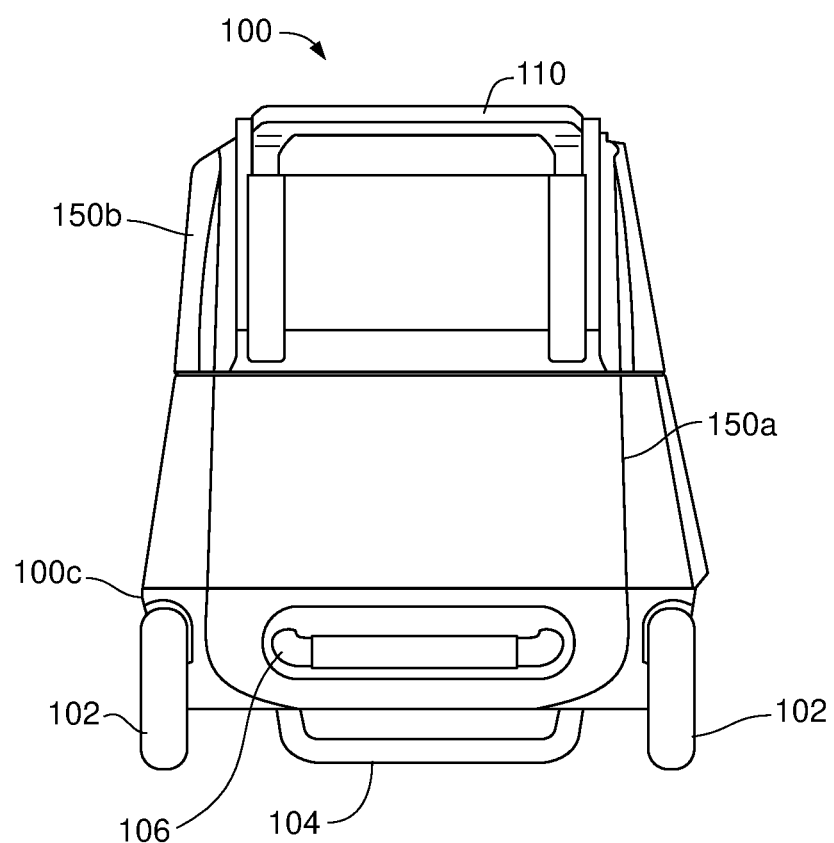
Figure 2A:
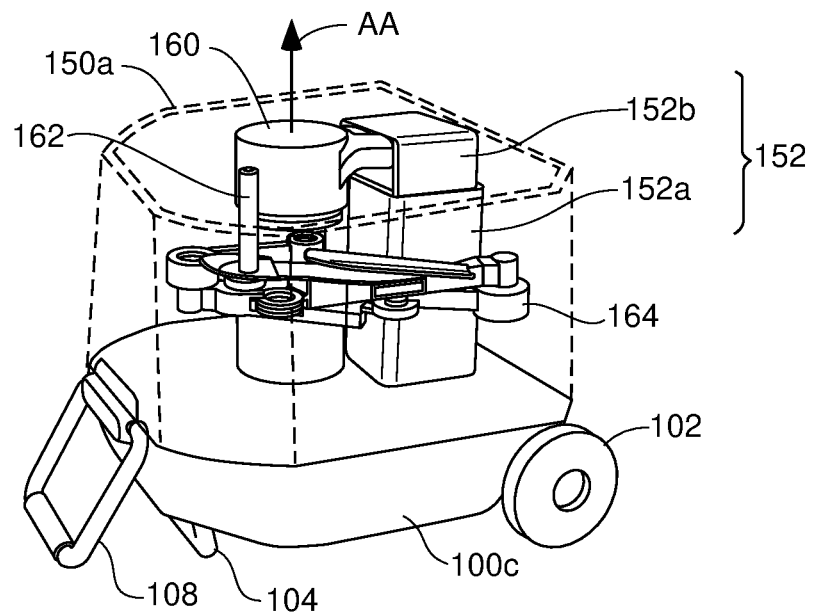
Figure 2B:
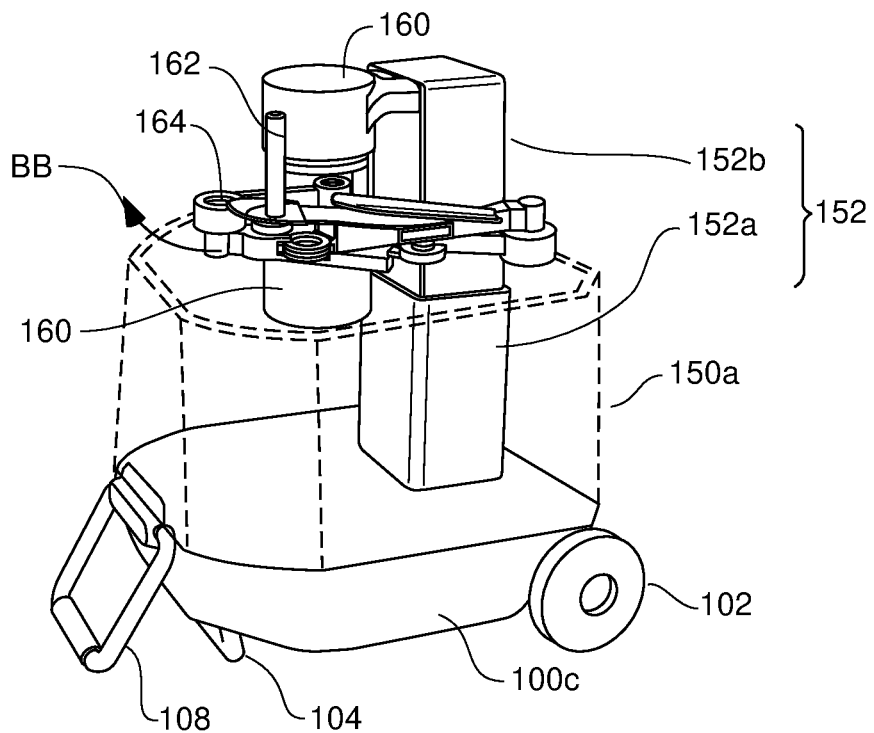
Figure 2C:
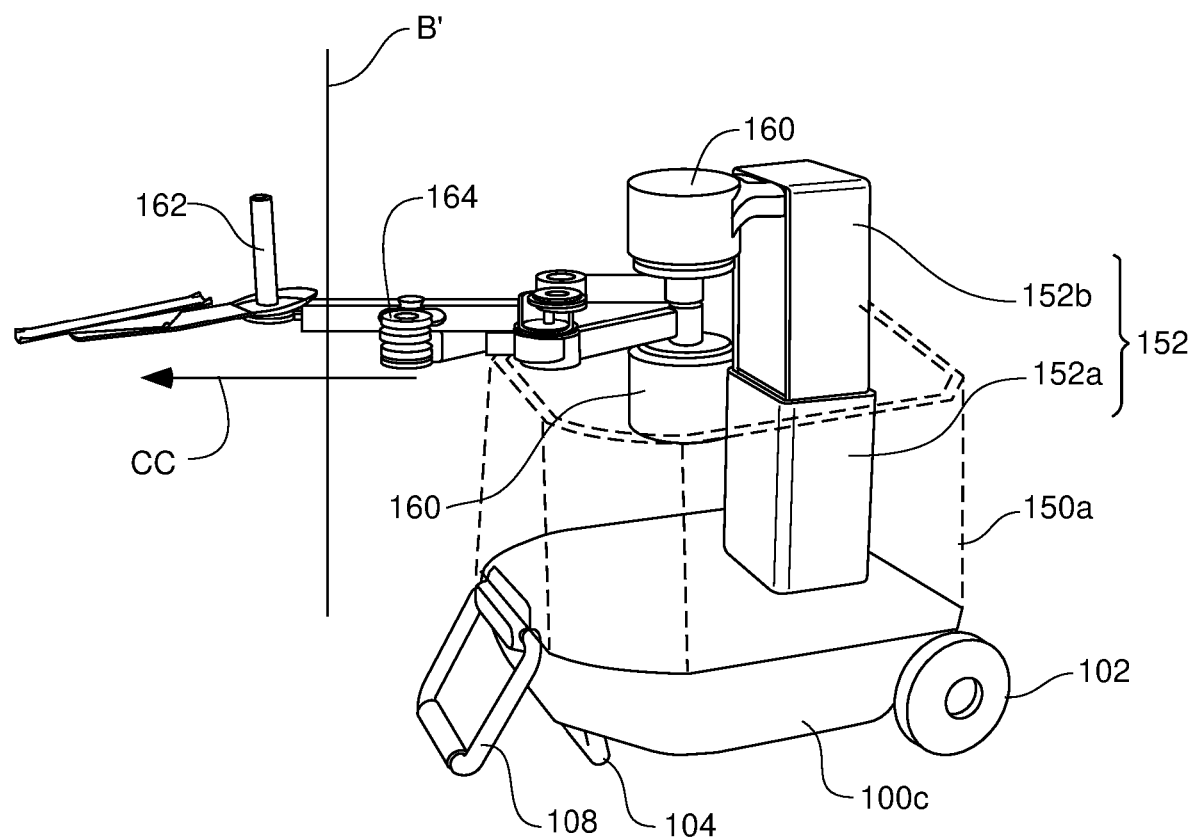
Figure 4A:
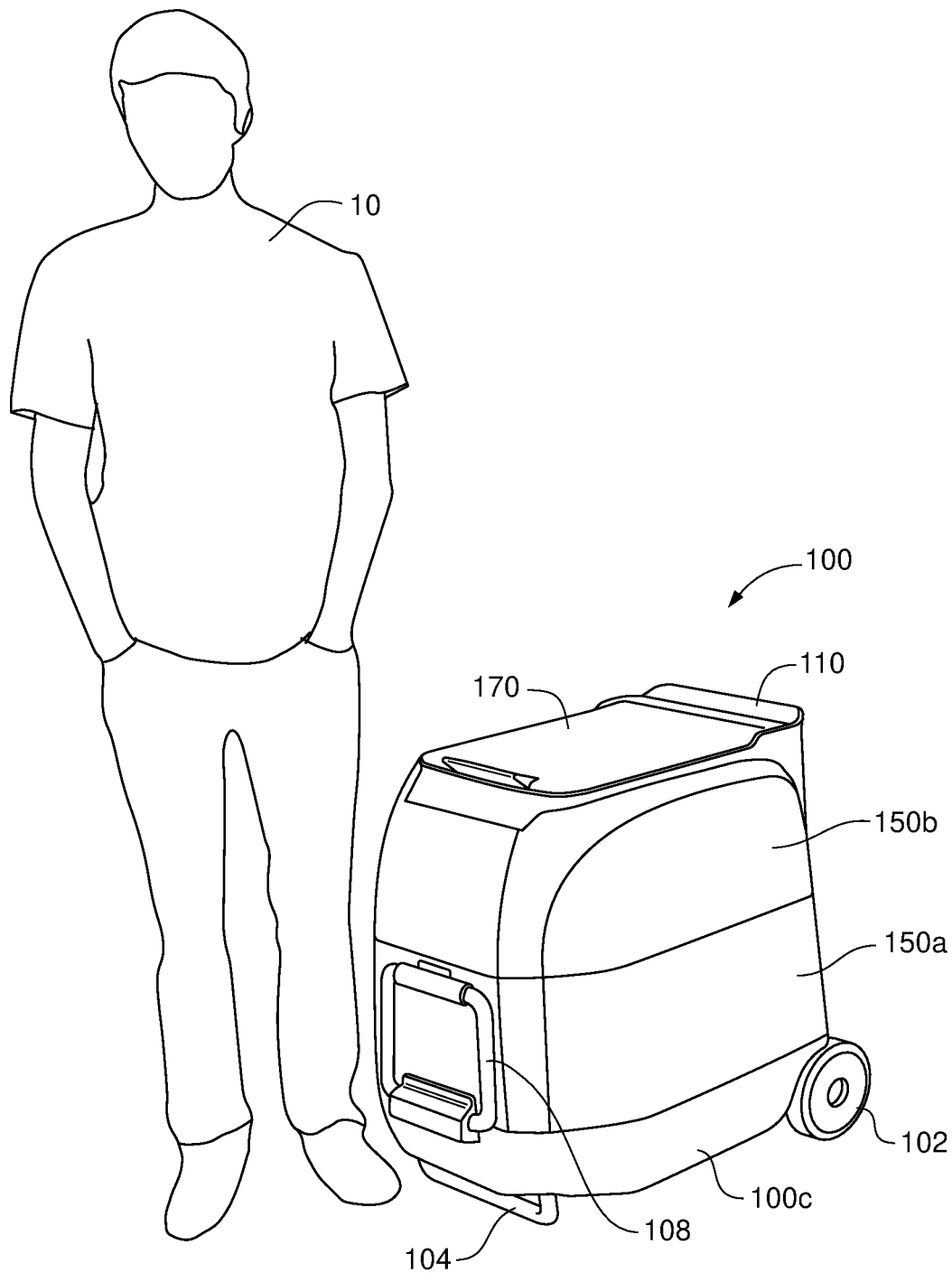
Figure 4B:
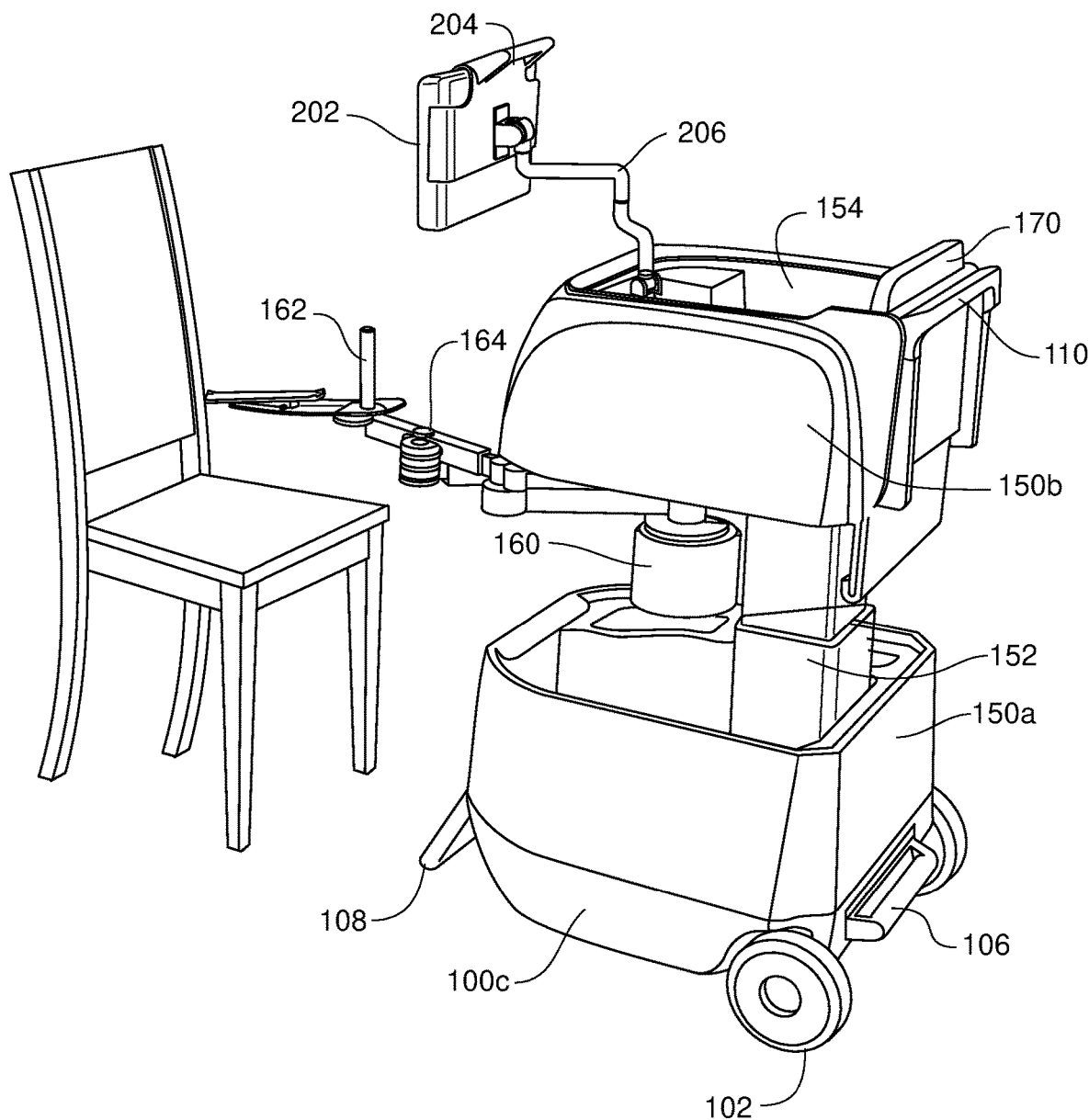
Figure 4C:
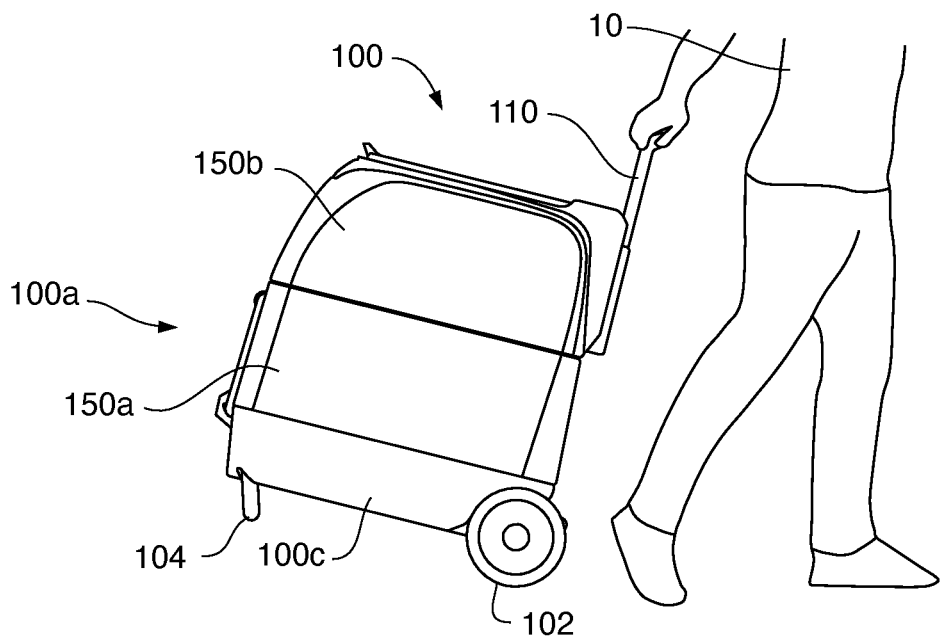
Figure 4D:
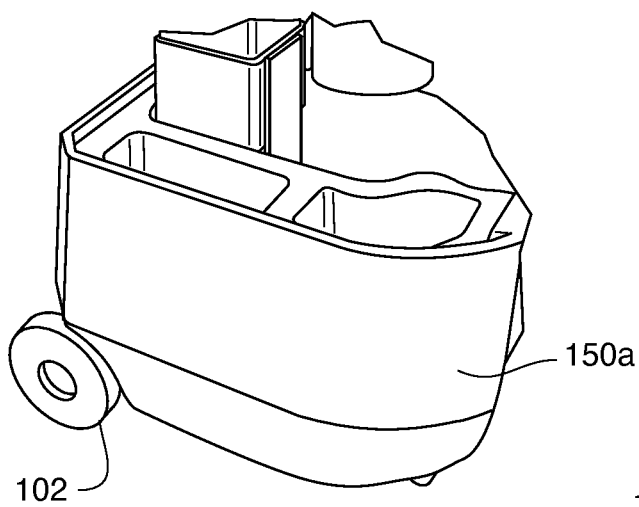
Figure 4E:
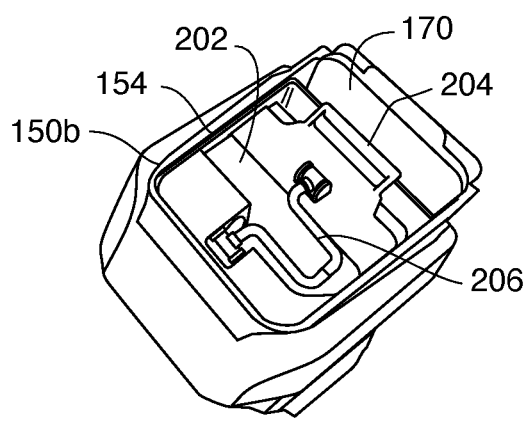
Figure 5A:
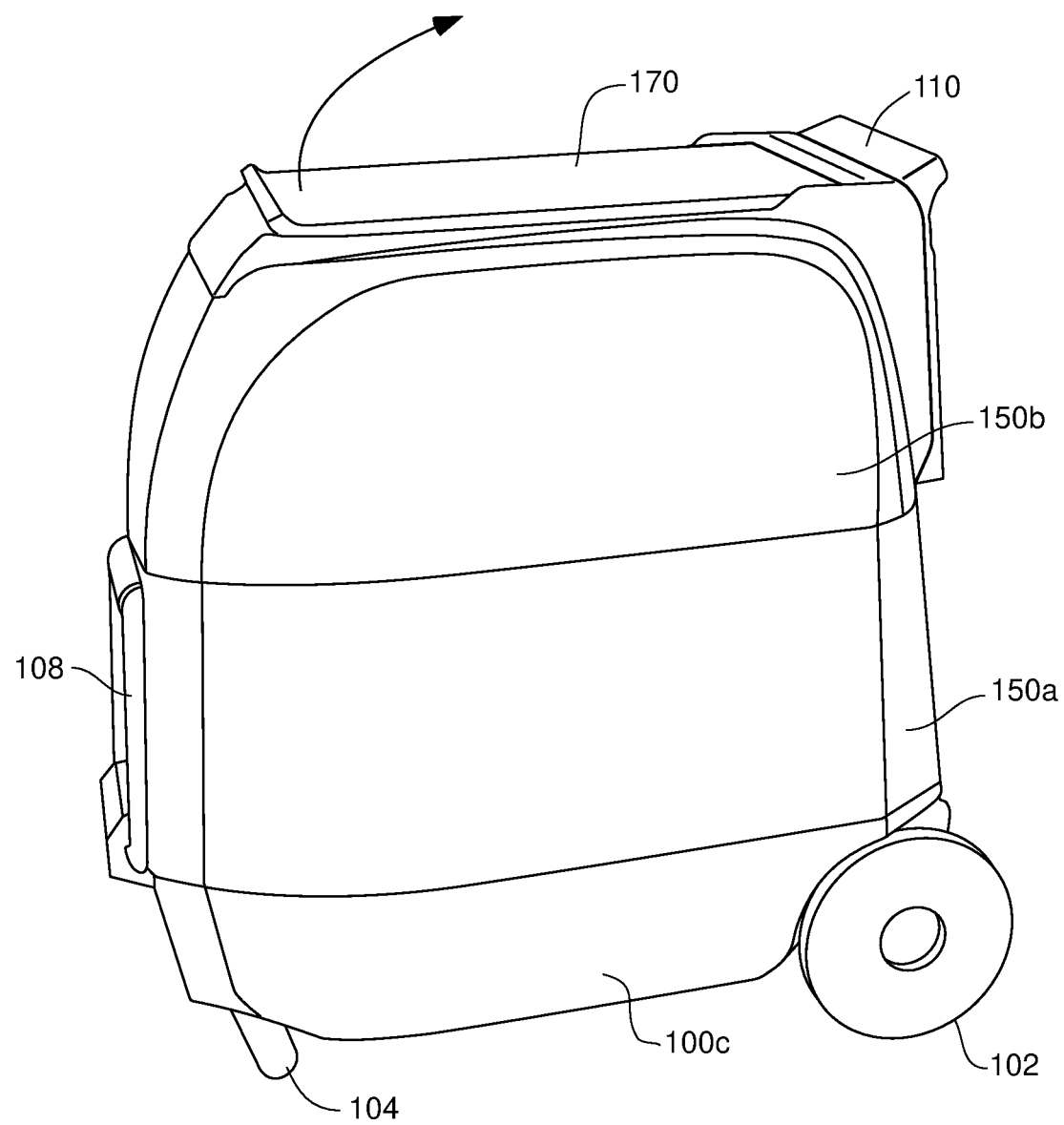
Figure 5B:
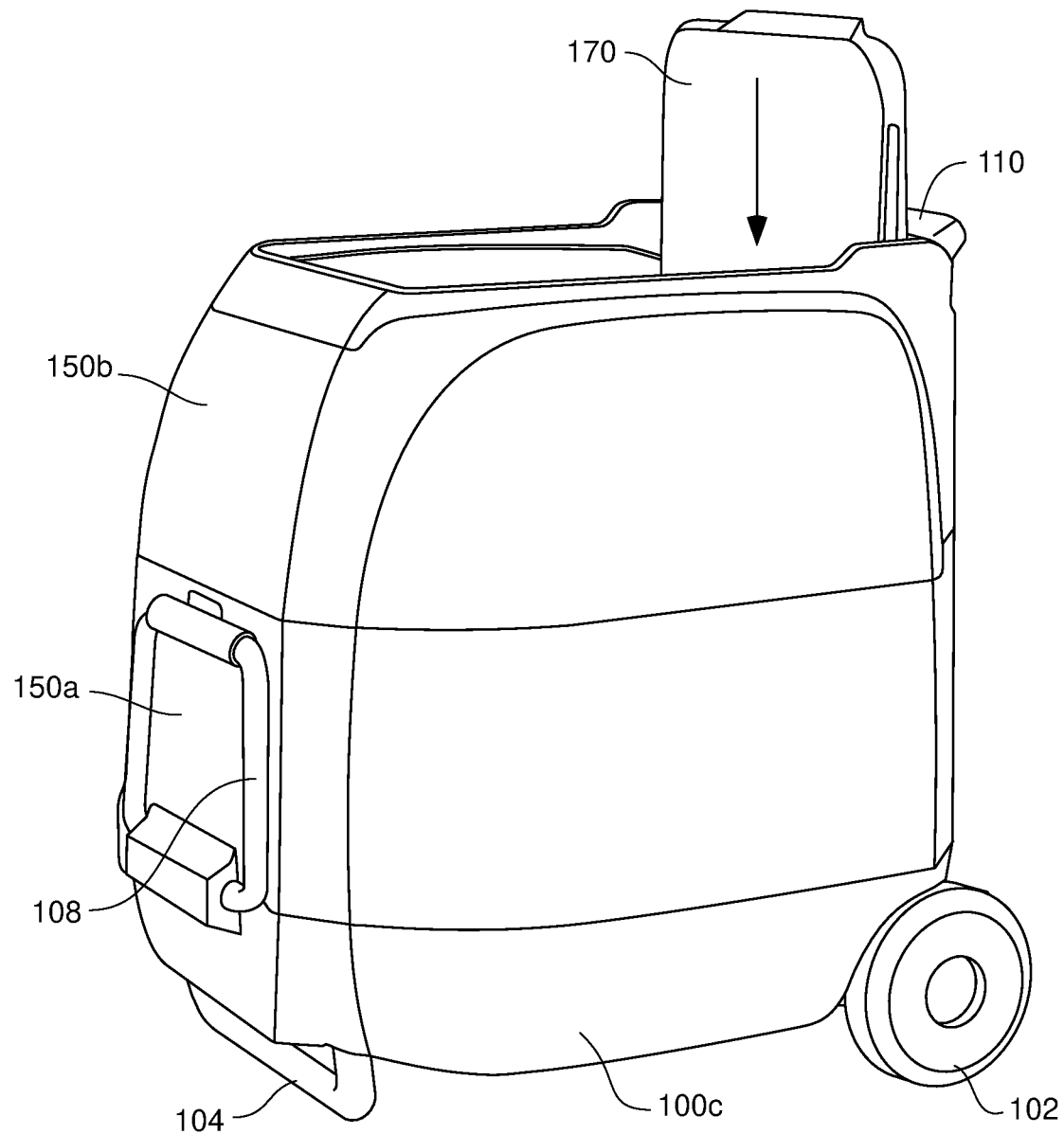
Figure 5C:
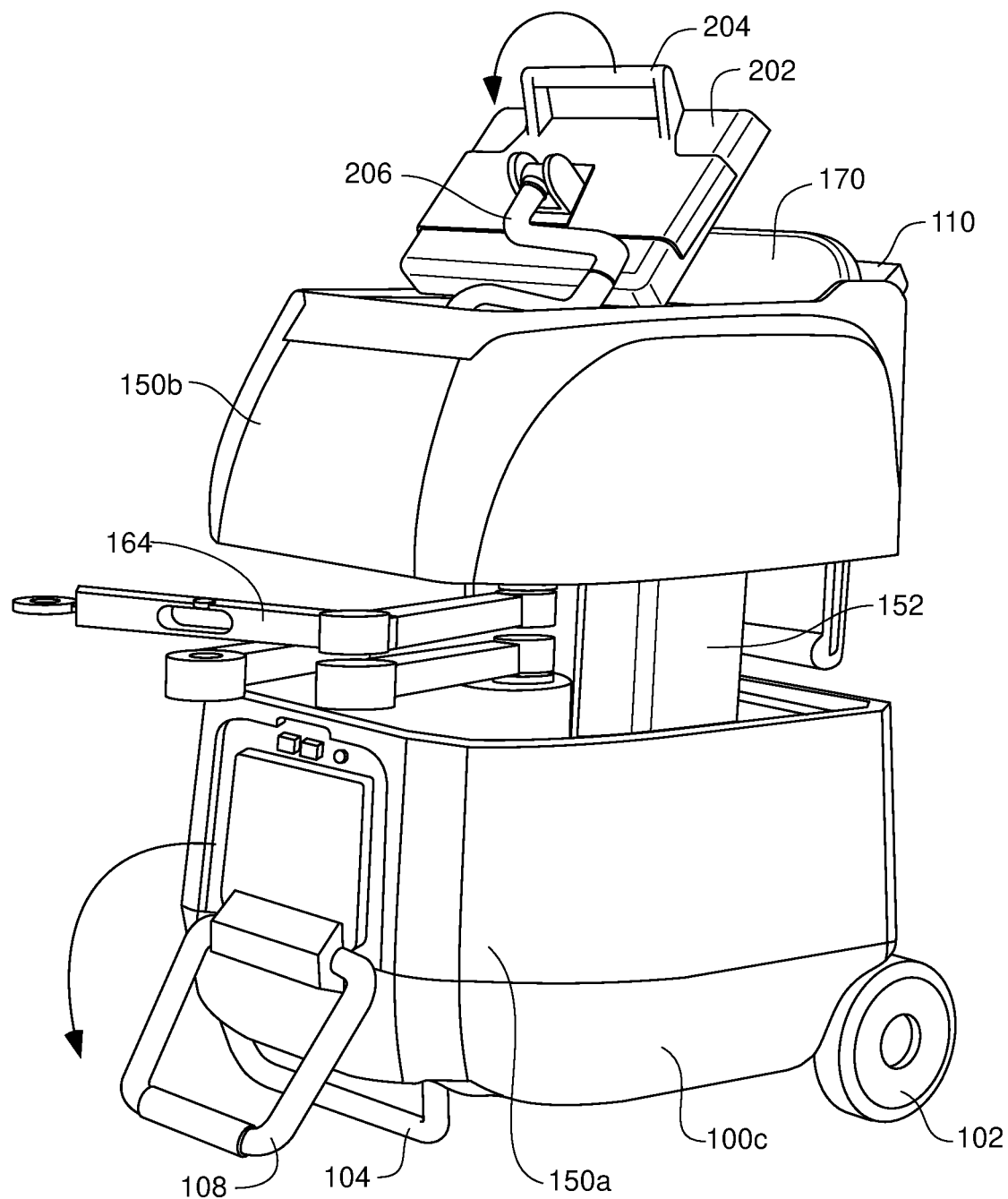
Figure 5D:
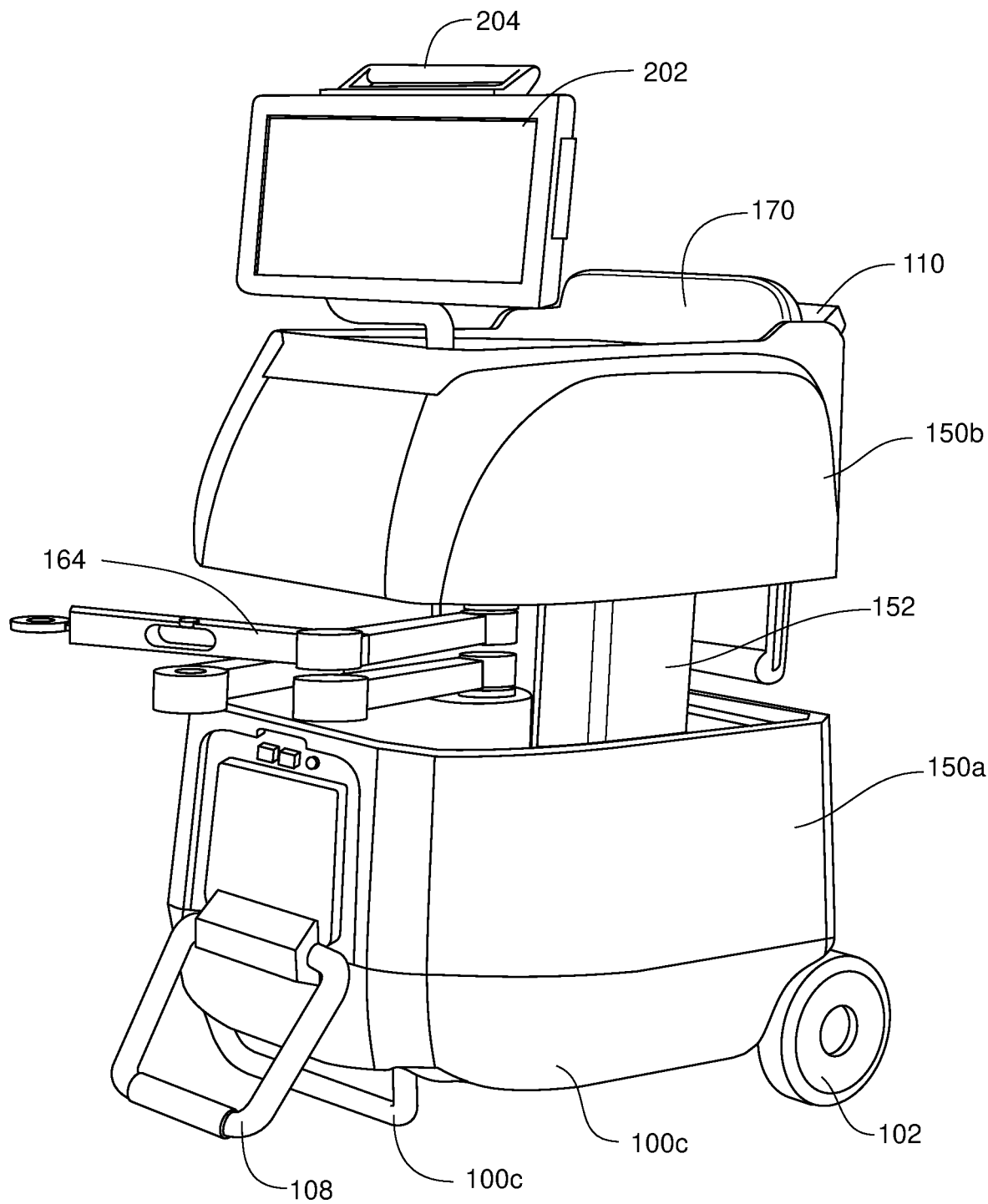
Figure 5E:
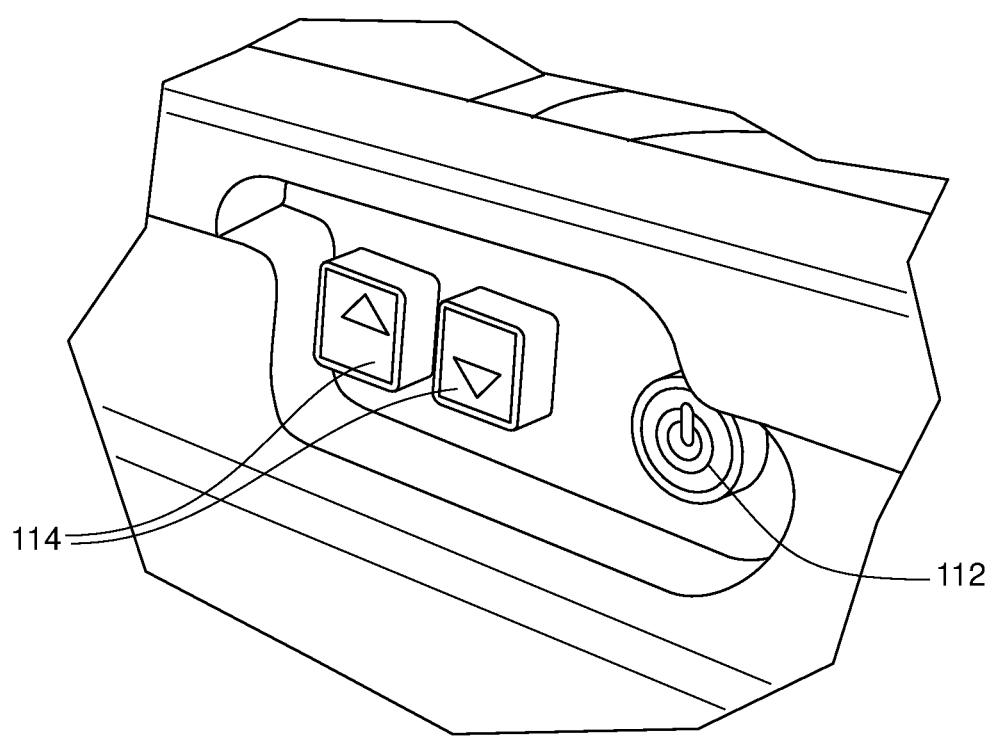
Figure 6A:
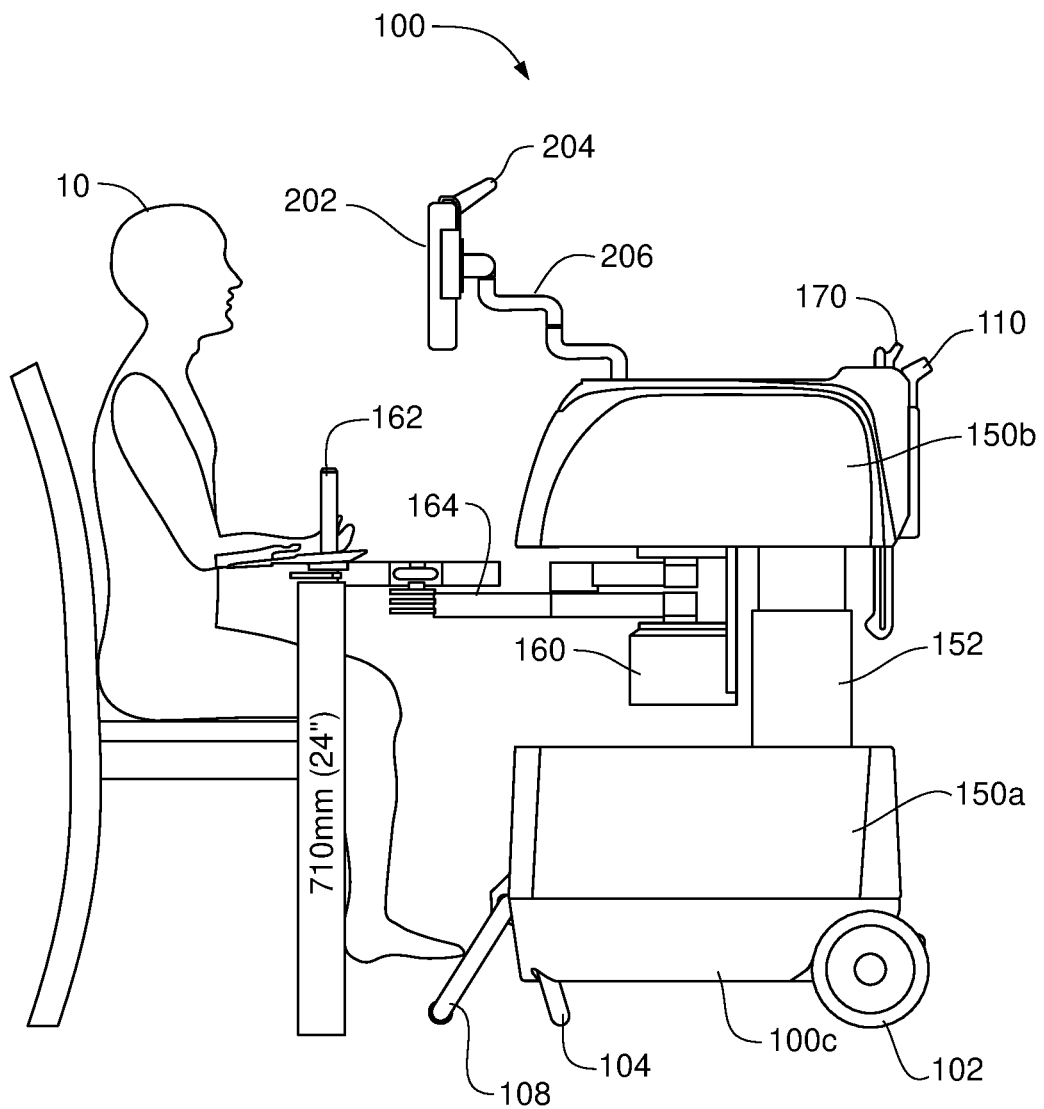
Figure 6B:
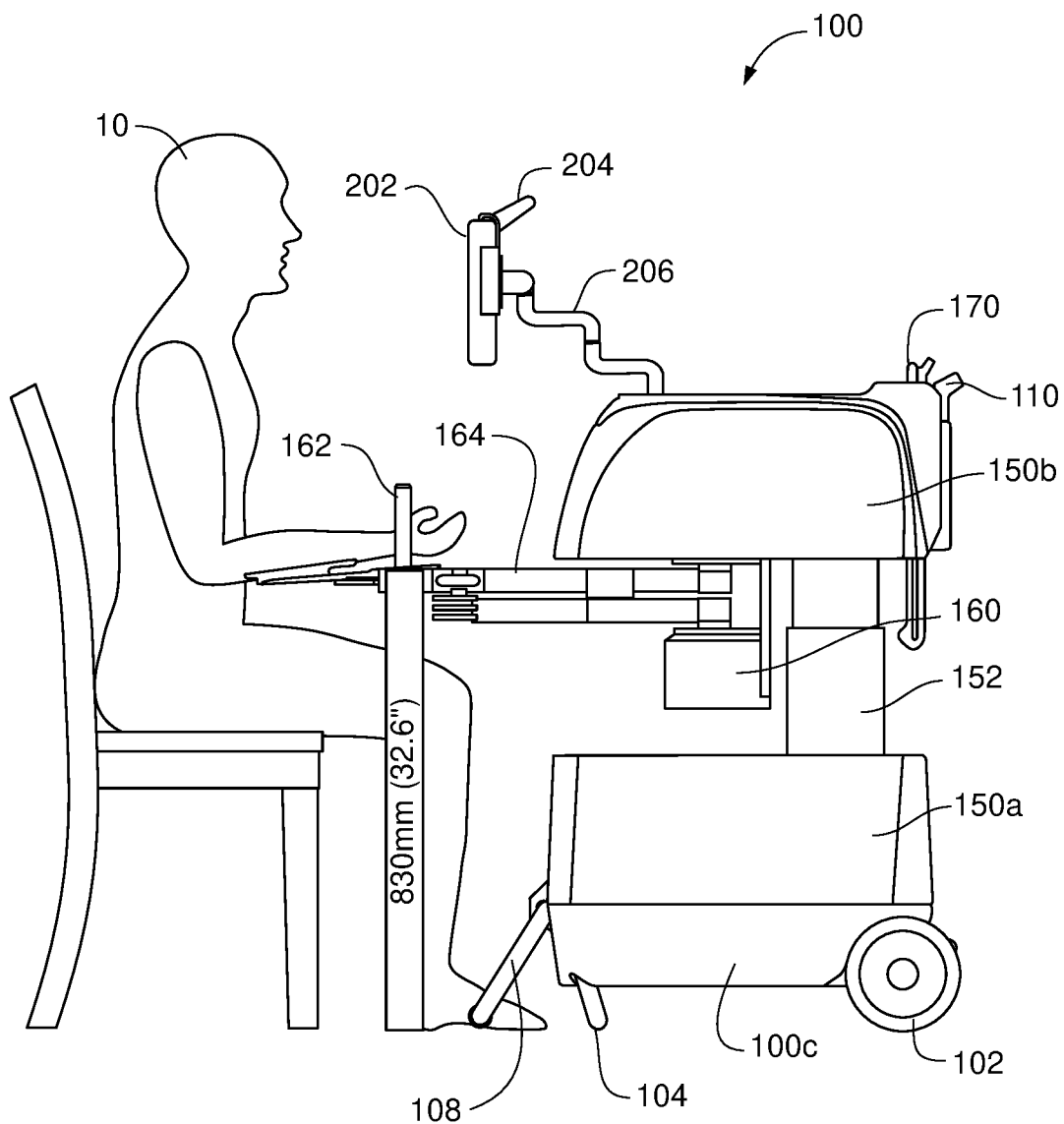
Figure 6C:
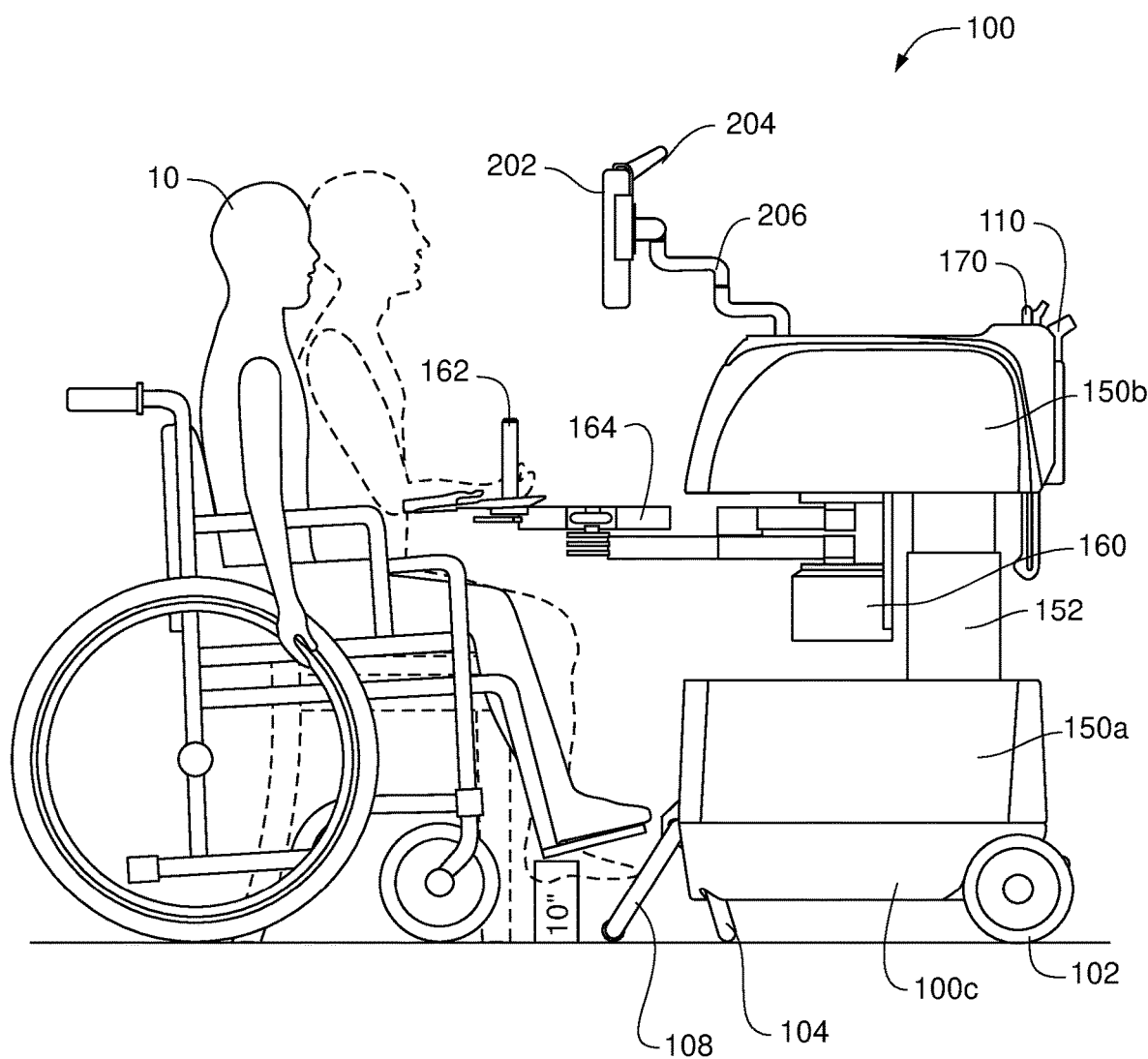

FIGS. 1A, 1B and 1C are side, front and back elevations, respectively, of the mobile rehabilitation apparatus in a closed or stowed position in accordance with a preferred embodiment of the present invention;

FIGS. 2A, 2B and 2C are perspective views of the mobile rehabilitation apparatus in a closed position, a transition (or intermediate) position, and an open (or deployed) position respectively, in accordance with a preferred embodiment of the present invention, with the upper housing portion of the apparatus omitted for clarity and the lower housing portion shown in transparent outline to reveal details of the interior thereof;

FIGS. 3A, 3B, 3C, 3D and 3E are front perspective views of a monitor of the portable apparatus mounted to an articulated arm being deployed from a monitor stowage position to a monitor in-use position in accordance with a preferred embodiment of the present invention;

FIGS. 4A, 4B and 4C are perspective views of the mobile rehabilitation apparatus in various positions in an exemplary deployment of the apparatus, in accordance with a preferred embodiment of the present invention;

FIG. 4D is a detailed, reverse side, perspective view of the lower housing assembly of the mobile rehabilitation apparatus shown in FIG. 4B;

FIG. 4E is a top down perspective view of the top housing portion of the mobile rehabilitation apparatus shown in FIG. 4B;

FIGS. 5A, 5B, 5C and 5D are front perspective views of the mobile rehabilitation apparatus showing the progression of positions of the apparatus during set up in accordance with a preferred embodiment of the present invention;

FIG. 5E is a detailed front perspective view of the mobile rehabilitation apparatus shown in FIG. 5C wherein the power button and directional buttons are more clearly shown;

FIGS. 6A, 6B and 6C are side elevation views of the mobile rehabilitation apparatus in the open position adjusted to accommodate users of different heights; and FIGS. 7A, 7B, 7C and 7D are a top perspective, a side perspective, a side view, and a top view, respectively, of the linkage having motors in a horizontal arrangement in accordance with an alternate embodiment of the present invention.

DETAILED DESCRIPTION OF THE PREFERRED EMBODIMENTS

The description that follows, and the embodiments described therein, is provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The figures are not to scale, and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention.

In order that the invention may be more fully understood, it will now be described, by way of example, with reference to the accompanying drawings in which FIG. 1 through FIG. 7 illustrate embodiments of the present invention.

Referring to FIGS. 1A, 1B and 1C, there is shown a preferred embodiment of the mobile rehabilitation apparatus 100 (or "unit 100") in a closed or stowed position. FIG. 1A depicts a side view of the unit 100 having a front portion 100a and a rear portion 100b. FIG. 1B depicts the front portion 100a of the unit 100. FIG. 1C depicts the rear portion 100b of the unit 100. As shown in FIGS. 1A-C, in a preferable embodiment, the apparatus 100 includes a base 100c with two wheels 102 (or "casters 102") on either side of the apparatus proximal to the rear (or back) portion 100b of the unit and a fixed front support 104 (alternately "stand 104") mounted on a lower surface of the base 100c proximal to the front portion 100a of unit 100. In a preferred embodiment, the wheels 102 facilitate movement of the unit 100 by a user and the fixed front support 104 serves as a stand to maintain a level position, and/or maintain the apparatus in an upright position, when the unit 100 is not in transit. In a preferred embodiment, a tilt bar 106, as shown in FIG. 1C projecting from the rear portion 100b of the base 100c, is included to facilitate the transition of the unit 100 from a stationary position to a tilted position for transit. The wheels 102 have a diameter of about 7 inches.

As depicted in FIGS. 1A-C, in a preferred embodiment, the unit 100 further includes a stabilizer 108 (or hinged support 108) that is pivotable about a horizontal axis "A'" between an engaged position and a disengaged position and is positioned proximal to the front portion 100a of the unit 100. The stabilizer 108 preferably includes a proximal portion and a distal portion, the proximal portion pivotally connected to the lower housing portion 150a and the distal portion adapted to engage a surface when the rehabilitation robot is deployed to maintain the apparatus 100 in an upright position during use of the robot by the user. In a preferred embodiment, the distal portion of the stabilizer 108 is in contact with the floor in the engaged position to provide additional support for the unit 100 during use and stowed within or adjacent to the front portion 100a of the unit 100 when in the disengaged position. In a preferred embodiment, the stabilizer 108 includes a switch (not shown) to facilitate activation of the mobile unit 100 when the stabilizer 108 is in the engaged position. In an embodiment, the switch is adapted to power on the unit 100 when the stabilizer 108 is in the engaged position. In an alternate embodiment, the switch is adapted to activate the power button (as shown in FIG. 5E) when the stabilizer 108 is in the engaged position to prevent undesired activation when the unit 100 is in the stowed position. In an alternate embodiment, the switch is operable to automatically induce a displacement of an upper mast portion or the mast assembly (described below), such that when the distal portion of the stabilizer engages the surface, the upper mast portion moves to a raised position and when the distal portion is disengaged from the surface, the upper mast portion moves to a collapsed position.

As shown in FIGS. 1A-C, in accordance with a preferred embodiment of the present invention, the apparatus 100 includes a housing assembly 150 (or "housing 150") with a lower portion 150a (or "lower housing portion 150a") supported by the base 100c and an upper portion 150b (or "upper housing portion 150b") moveable relative to the lower portion 150a, the upper portion 150b connected to the lower portion 150a by a telescopic motorized mast assembly 152 (or lifting column 152) as shown in FIGS. 2-6. In a preferred embodiment, the upper housing portion 150b is sized to be received within the lower housing portion 150a. In an alternate embodiment, the lower housing portion 150a is sized to be received within the upper housing portion 150b.

FIGS. 1A-C also depict a carry handle 110 mounted to the upper housing assembly 150b proximal to the rear portion 100b of the unit 100 in accordance with a preferred embodiment. In a preferred embodiment, the carry handle 110, as shown in FIGS. 4B and 4C, is movable (e.g., slidable) between a stowage position and an engaged position. In the stowage position, the carry handle 110 is retracted within the housing assembly 150. In the engaged position, the carry handle 110 is extended in a vertical direction beyond the upper housing portion 150b to tilt the unit 100 about the wheels 102 (e.g., via the tilt bar) and facilitate movement of the unit 100 while in the closed position (i.e., the front portion of the unit is off the ground to facilitate movement by rolling) as shown in FIG. 4C.

In a preferred embodiment, the unit 100 is about 730 mm (or about 28.7") in height, about 680 mm (or about 26.7") in length, and about 615 mm (or about 24.2") in width. Persons having ordinary skill in the art will appreciate that the foregoing dimensions are exemplary and that smaller heights, lengths, and/or widths of the unit 100 may be possible in accordance with the present invention.

In accordance with the present invention, the housing assembly (or "housing") is preferably rectangular in profile having front contoured corners. The interior of the housing assembly is preferably adapted to form a compartment sized to accommodate a rehabilitation robot when the unit is in the closed position. Persons having ordinary skill in the art will appreciate that housing assemblies may also have non-rectangular profiles (e.g., elliptical, cube, etc.). In a preferred embodiment, the lower housing portion is supported by the base and the upper housing portion is supported by the upper mast portion (described below). The lower housing portion preferably defines a compartment sized to accommodate the rehabilitation robot and the linkage when the robot is not in use. The upper housing portion is preferably moveable relative to the lower housing portion between a stowage position, where the upper housing portion rests proximate to the lower housing portion, and a deployment position where the upper housing portion is spaced apart from the lower housing portion.

Referring to FIGS. 2A, 2B and 2C, there is shown an embodiment of the portable or mobile rehabilitation unit 100 in the extended position adapted for use with an InMotion ARM/HAND™ apparatus provided by BIONIK LABORATORIES CORP. (Toronto, ON, Canada). The InMotion Hand™ and InMotion Arm™ robots preferably work together to provide motor therapy that combines reaching with grip and release movements. The robots quietly monitor the patient's movements during therapy and may gently assist as needed to help the patient complete various motor therapy activities. InMotion robots may be used by patients experiencing a wide range of motor impairments including stroke, cerebral palsy, spinal cord injury, multiple sclerosis, Parkinson's disease, hemiplegic shoulder pain and/or muscle spasticity. The InMotion robots include linkages to moveably support the hand actuator assembly and forearm rest assembly, for example, as further disclosed in U.S. Provisional Patent Application Ser. No. 62/780,975 filed on Dec. 18, 2018 and hereby incorporated by reference.

FIGS. 2A, 2B and 2C depict a perspective view of the unit 100 transforming, or transitioning, between a closed or stowed position to an open or extended position with the upper housing assembly removed and the lower housing assembly 150a depicted as a transparent outline, in accordance with a preferred embodiment of the invention. FIG. 2A shows the unit 100 in the closed position with the stabilizer 108 in the engaged position, whereby the motors 160, forearm support 162 and linkages 164 are collapsed or in a transport mode. FIG. 2B shows the unit 100 in a transition position, whereby the motorized lifting column 152 (or "mast assembly 152") is raised or moves in direction "AA" (shown in FIG. 2A). The motorized lifting column 152 raises to clear off or open the upper housing assembly (not shown). The motors 160 and linkages 164 (e.g., scissors mechanism) are raised to a predetermined or desired height of the user (not shown). FIG. 2C shows the unit 100 in the open position, whereby the motorized lifting column 152 or mast assembly 152 is positioned at the predetermined or desired height for the user (not shown). In the open position, the linkages 164 are pivoted or rotated about a vertical axis B' in direction "BB" (shown in FIGS. 2B and 2C) and extended in direction "CC" (shown in FIG. 2C) to prepare the forearm support 162 to receive an arm of the user (not shown).

In preferable embodiments, the linkage motors 160 are adapted to pivot and extend the linkages 164 to prepare the unit 100 for operation. In one preferred embodiment, the linkage motors 160 are mounted on top of one another, or in a stacked or vertical layout, such that the motors 160 are supported by the upper mast portion in a cantilevered arrangement, as shown in FIGS. 2A-C. In another preferred embodiment, the linkage motors 160 are mounted beside one another, or in a side-by-side layout, such that the motors 160 are supported on a lower surface by a platform projecting from the upper mast portion, as shown in FIGS. 7A-D. Persons of ordinary skill in the art will understand that a linkage is a mechanism involving two or more levers and that a lever is a rigid bar that can rotate around a fixed pivot (i.e., a fulcrum). A linkage is typically adapted to transfer one mechanical motion to another (e.g., circular to linear). Simple linkages typically include a lever attached to a lever, such as the linkage described in the present invention.

In a preferable embodiment, the linkages 164 are a scissors mechanism including linked, folding supports in a criss-cross "X" pattern as shown in FIG. 2C. Persons having ordinary skill in the art may understand that extension is achieved by applying pressure to the outside of a set of supports located at one end of the mechanism (e.g., by the motors 160), elongating the crossing pattern. Extension may be achieved hydraulic, pneumatic, mechanical and/or manual means.

Figure 7A:
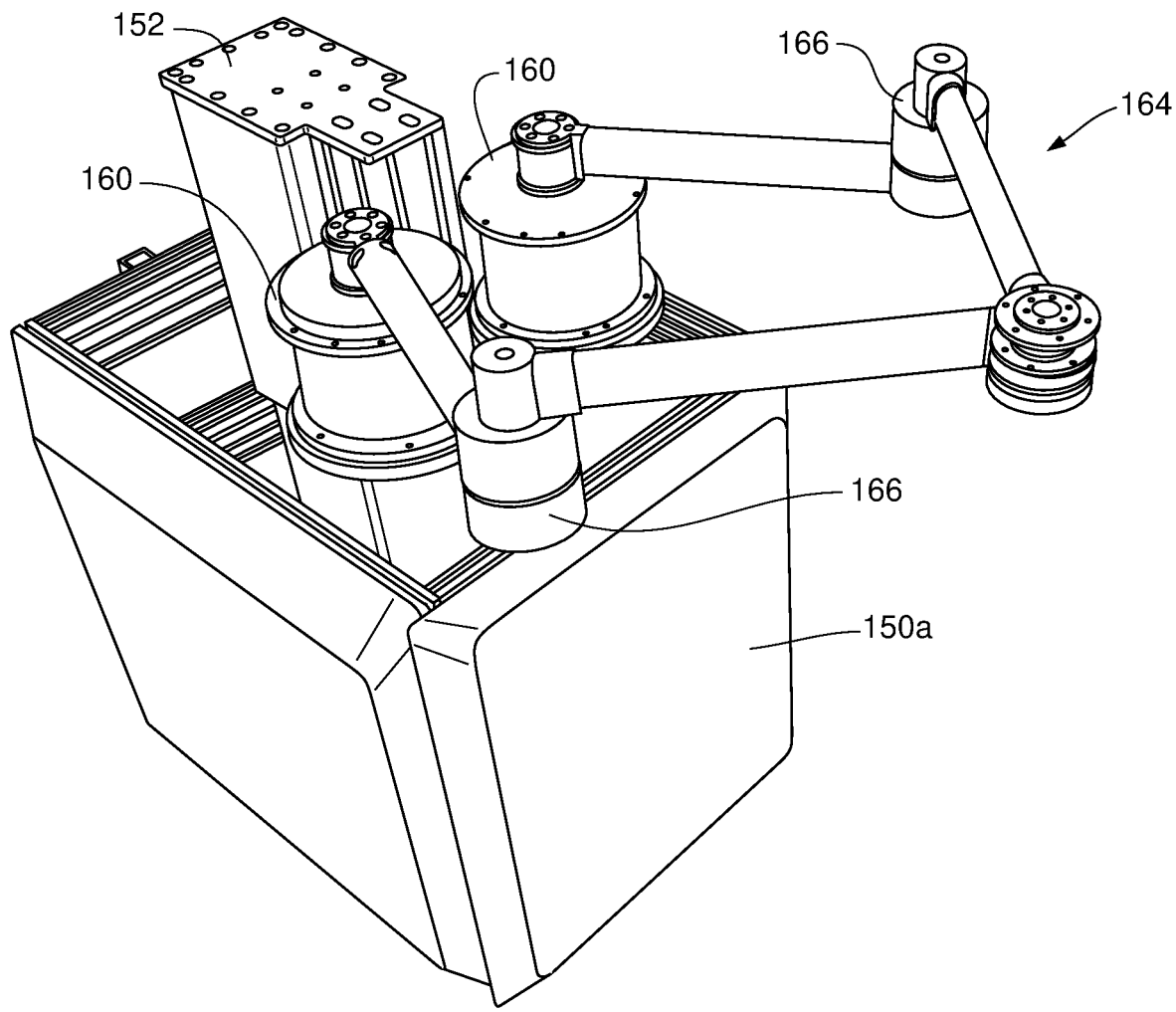
Figure 7B:
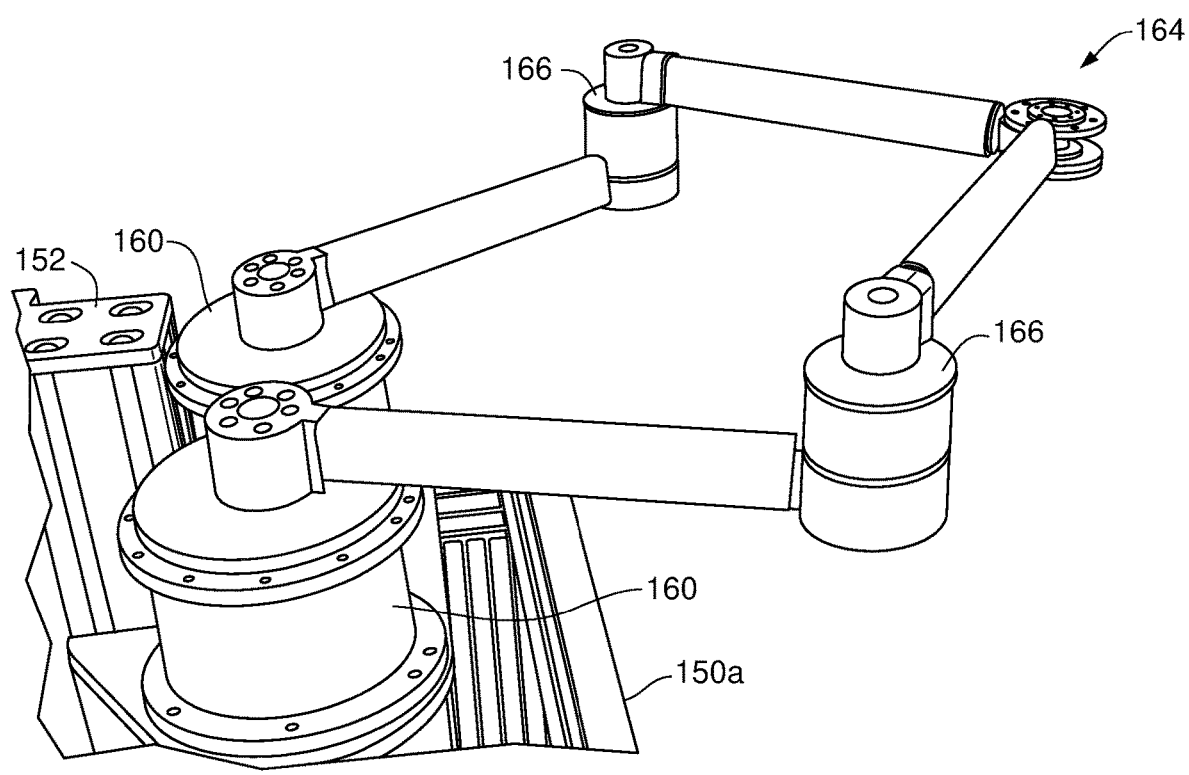
Figure 7C:
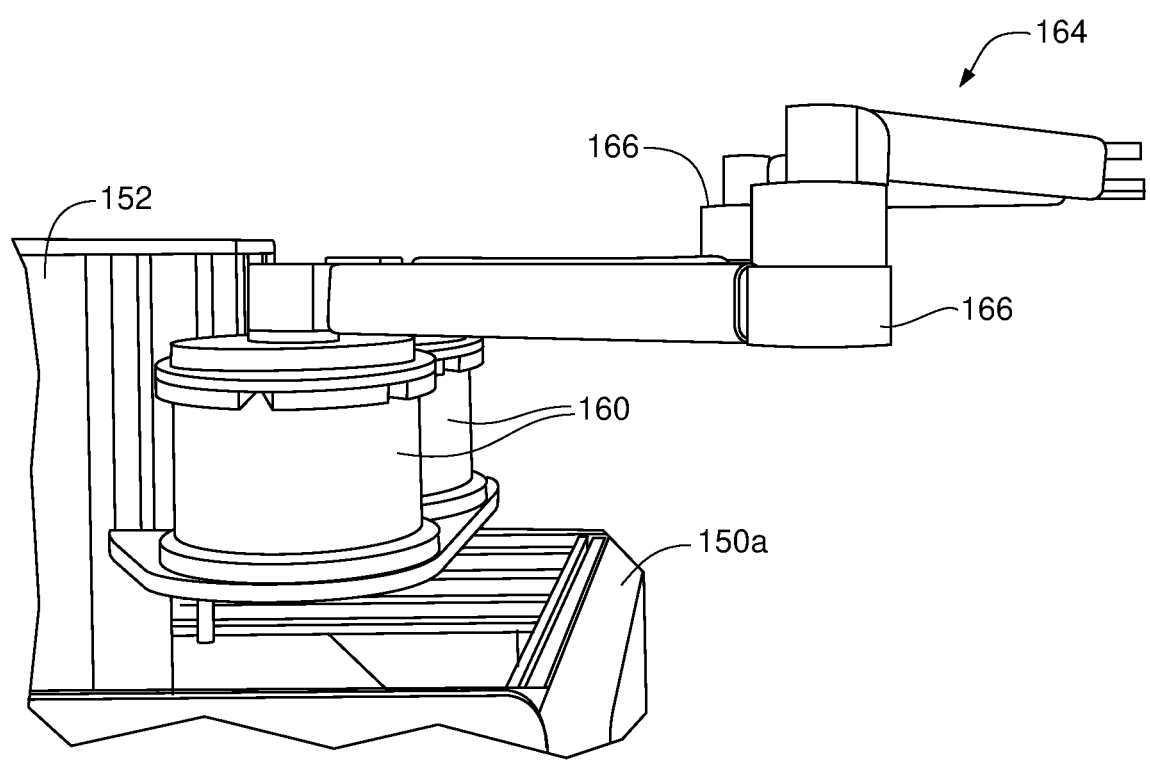
Figure 7D:
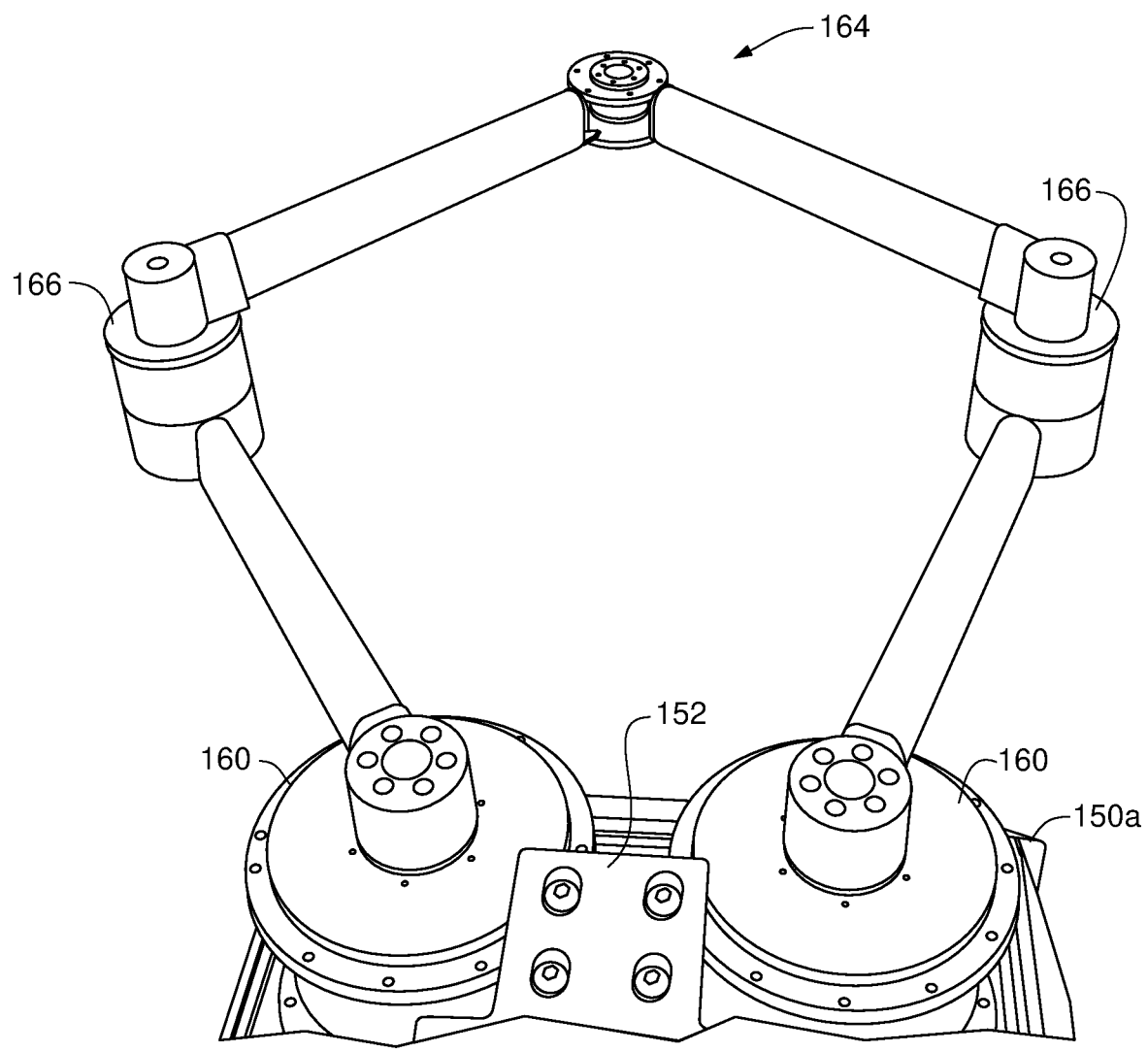

In a preferable embodiment, the linkage 164 is similar to a five-bar linkage mechanism as shown in FIGS. 7A-D, whereby one of the bars is notional and extends between the fixed pivot points (or fulcrums) of each motor 160. Persons having ordinary skill in the art may understand that extension of the linkage 164 is achieved by rotating the pivot points of each motor to urge the bars towards one another. In FIGS. 7A, B, C and D, the linkage 164 is depicted from a top perspective, a side perspective, a side view, and a top view respectively, transitioning between a stowed position to an extended position, whereby the motors 160 are rotating in a direction such that pivots 166 are moving closer together.

In preferred embodiments, when the mast assembly 152 (or "lifting column 152") is fully extended, an outer portion 152a of the column is adapted to receive an inner portion 152b of the column (i.e., the inner portion 152b nested within the outer portion 152a, such as a telescope), as shown in FIGS. 2A-C. The outer portion 152a is preferably connected to the base 100c for stability (although the inner portion 152b may alternately be connected to the base 100c in an alternate embodiment). In embodiments, the inner portion 152b of the column 152 is preferably connected to the upper housing assembly 150b (although the outer portion 152a may alternately be connected to the upper housing 150b in an alternate embodiment). The lifting column 152 preferably includes a motor (not shown; for example, a geared motor, housed within the column 152) to facilitate movement of the upper sleeve 150b or housing assembly 150b relative to lower sleeve 150a or housing assembly 150a (i.e., to form a gap sufficient to allow the linkages 164 (or "arm 164") of the robot to extend outwardly toward the user).

When the lifting column 152 is fully retracted, the upper 150b and lower 150a housing assemblies are preferably shut together to completely enclose the interior space or compartment.

Figure 3A:
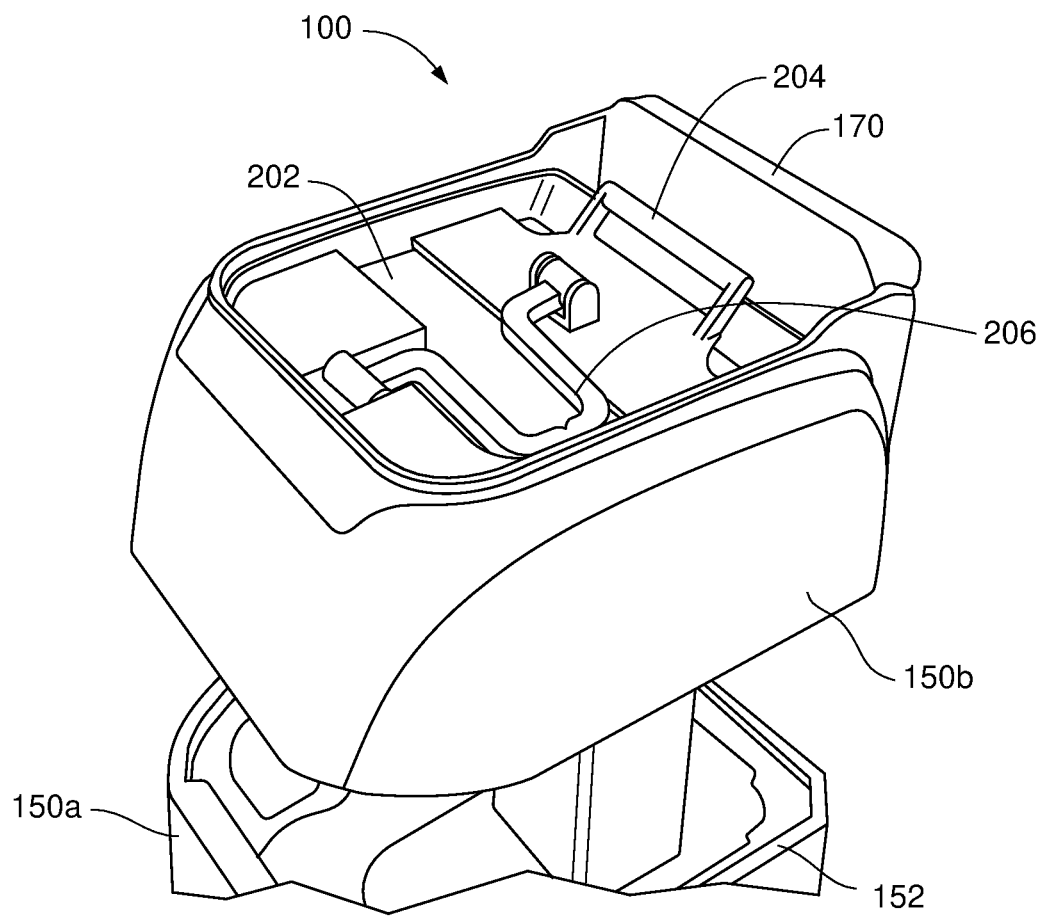
Figure 3B:
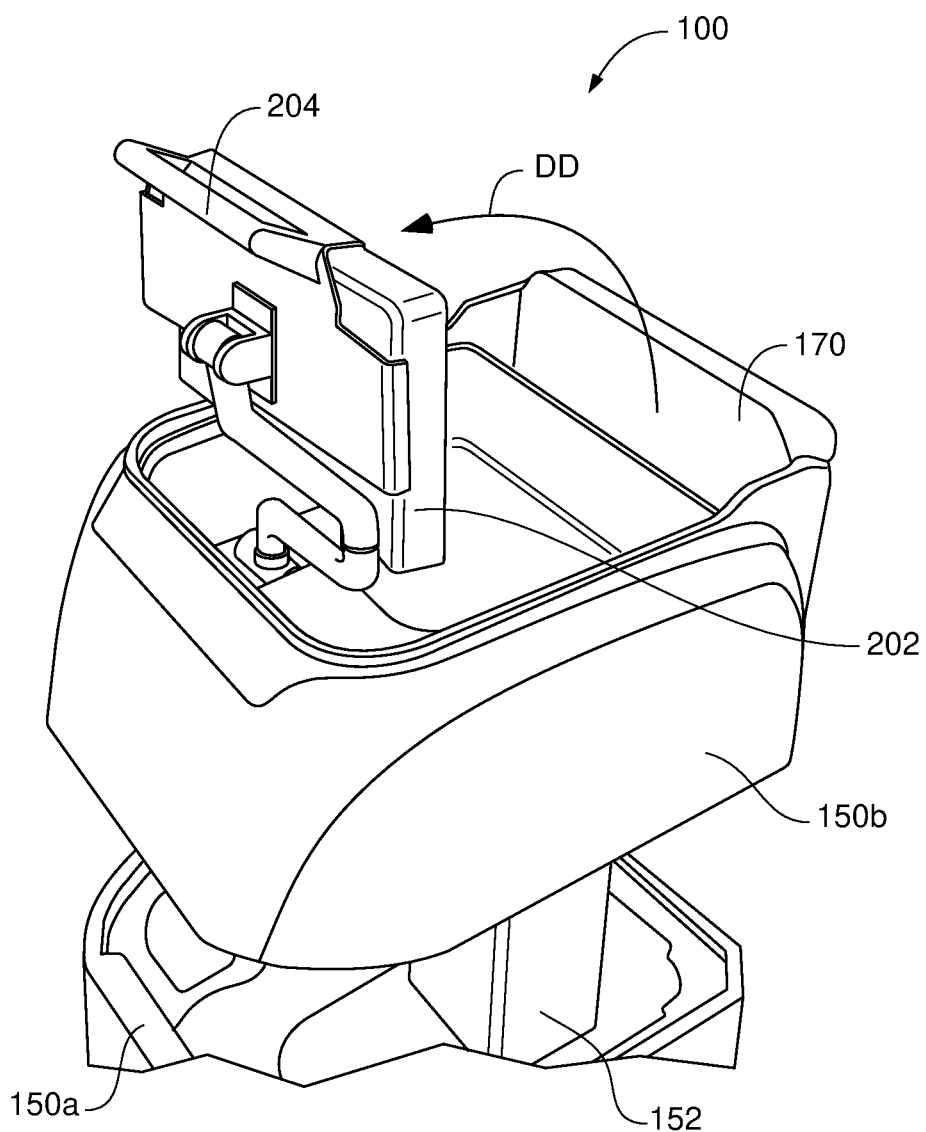
Figure 3C:
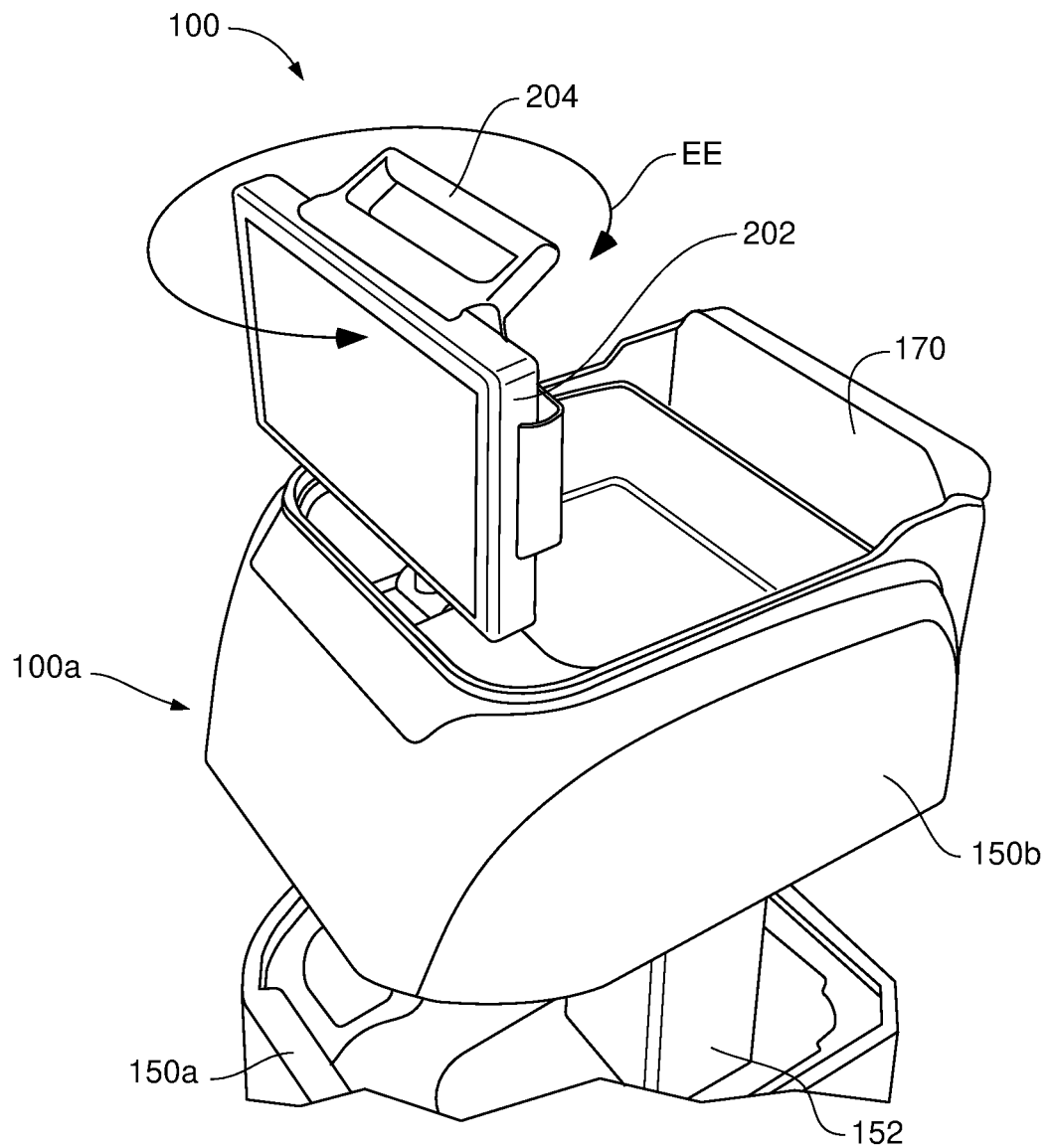
Figure 3D:
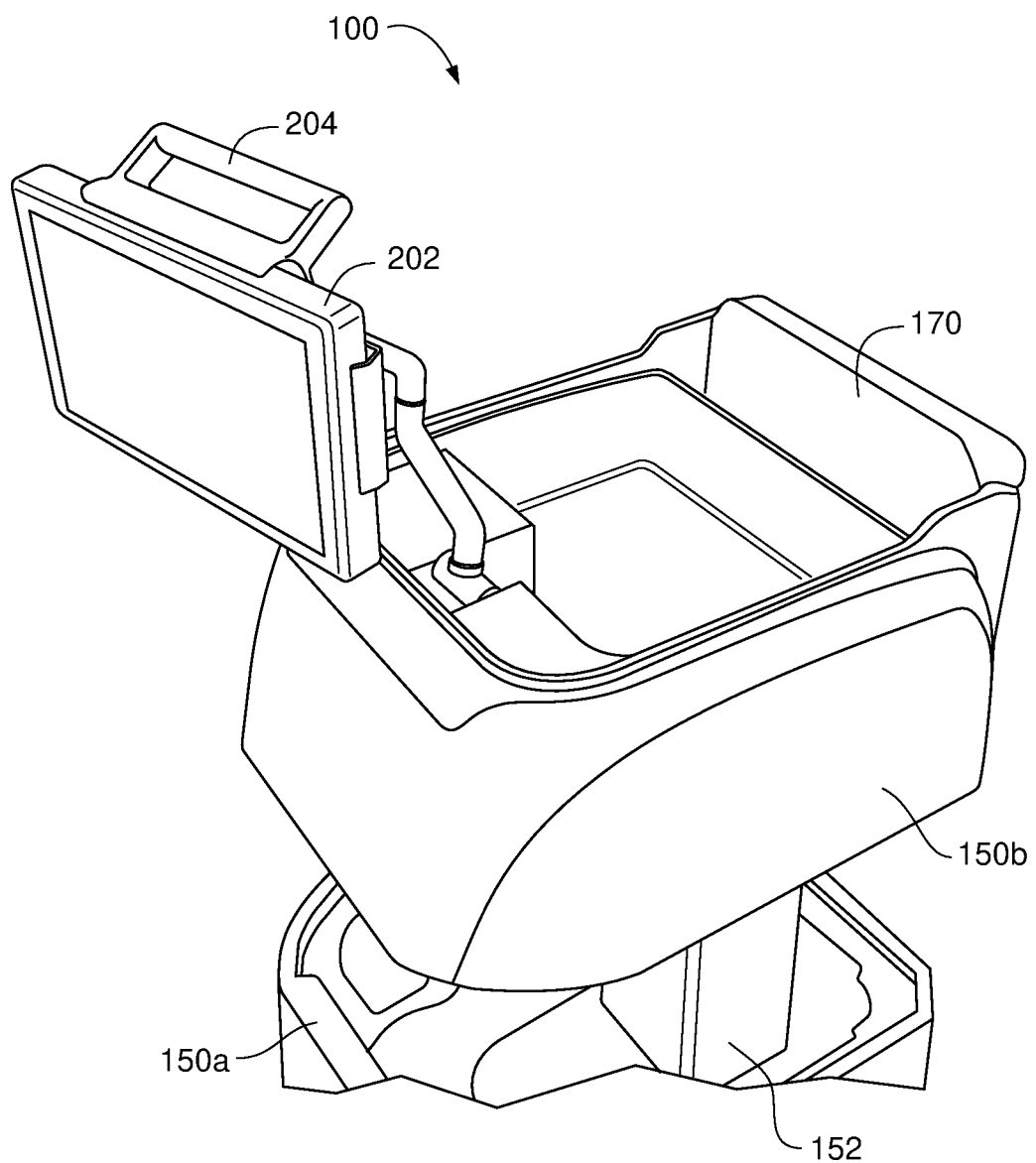
Figure 3E:
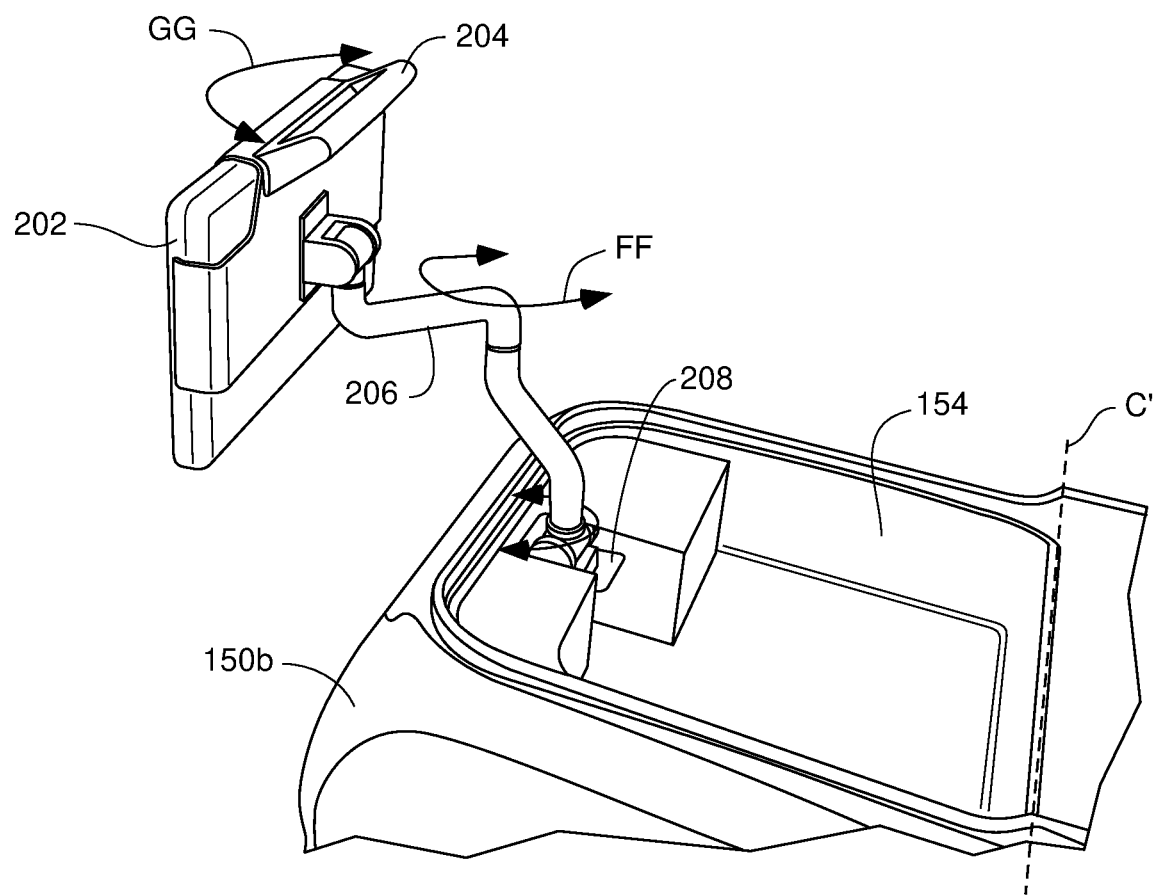

As shown in FIGS. 3A, 3B, 3C, 3D and 3E, a preferred embodiment of the present invention includes a monitor 202 (or "display 202" or "graphical user interface 202" or "GUI 202") mounted on an arm 206 moveable between a monitor stowage position and a monitor in-use position. In a preferred embodiment, the unit 100 includes a lid 170 in the upper housing assembly 150b to provide access to an interior compartment 154, defined by the upper housing assembly 150b, adapted to house the monitor 202 in the monitor stowage position (FIG. 3A). In the monitor stowage position, the display 202 is preferably positioned face down within the compartment 154. The lid 170 is adapted to pivot about a horizontal axis C' (as shown in FIG. 3E) between a closed lid position and an open lid position. In the open lid position, the lid 170 is preferably adapted to slide into the upper housing assembly 150b for storage during use of the unit 100 by the user.

FIGS. 3A-E depict the monitor deployment steps. In FIG. 3A, the lid 170 is moved from the closed lid position to the open lid position thereby providing access to the interior compartment 154. FIG. 3B depicts movement of the monitor 202 about a pivot from a horizontal position to a vertical (or raised) position (as shown by arrow "DD"). FIG. 3C depicts rotational movement of the monitor 202 about a point to rotate the monitor 202 to face the front portion of the unit 100a (as shown by arrow "EE"). FIG. 3D depicts horizontal or linear movement of the monitor 202 to extend the monitor in a forward direction (i.e., towards the user). FIG. 3E depicts the various rotational (as shown by arrow "FF") and tilting (as shown by arrow "GG") axes included to optimize the viewing angle of the monitor 202 for the user in accordance with a preferred embodiment of the invention. Tilting is preferably facilitated by a display handle 204 connected to the display 202. In a preferred embodiment of the present invention, a monitor arm 206 is adapted to provide four (4) degrees of freedom (e.g., translation, swivel and tilt). FIG. 3E further shows a vertical locking joint 208 to secure the monitor 202 during use of the rehabilitation robot by the user in accordance with a preferred embodiment of the present invention. The vertical locking joint 208 is further adapted to fix the height of the monitor 202 during use by the user. The monitor folding and unfolding assembly is preferably adapted to be compact when the unit 100 is in the closed position (as shown in FIG. 4E whereby the monitor is contained within the interior compartment 154).

FIG. 4A depicts a perspective view of the unit 100 in the closed or stowed position in accordance with a preferred embodiment. As shown in FIG. 4A, the closed position includes the stabilizer 108 in the disengaged position and the lid 170 in the closed lid position.

FIG. 4B depicts the unit 100 in the open position in accordance with a preferred embodiment, whereby the stabilizer 108 is in the engaged position, the lifting column 152 is extended to a predetermined height (for example, to a predetermined height of 482 mm to accommodate the user 10 in a seated position), the linkages 164 are in the extended position, and the monitor 202 is positioned for viewing by the user 10. As shown in FIG. 4B, in a preferred embodiment, the lower housing assembly 150a is adapted to provide one or more compartments for storage (e.g., accessories, as shown in FIG. 4D).

FIG. 4C depicts the unit 100 in transit by the user 10. The carry handle 110 is in the engaged position to pivot the unit 100 about the wheels 102 to facilitate movement of the unit 100 while in the closed position (i.e., the front portion 100a is tilted such that the front support 104 is off the ground to facilitate rolling movement by the wheels 102).

FIG. 4D depicts an enlarged view of the lower housing assembly 150a with the unit 100 in the open position, the lower housing assembly 150a adapted to include storage compartments for accessories (not shown).

FIGS. 5A, 5B, 5C and 5D depict the process of transforming the unit 100 from the closed position to the open position in accordance with a preferred embodiment of the invention. FIGS. 5A and 5B show the movement of the lid 170 from the closed lid position to the open lid position as previously described with the unit 100 in the closed position. FIG. 5C shows the movement of the stabilizer 108 from the unengaged position to the engaged position to facilitate activation of the unit 100 (for example, via activation of the sensor). Also depicted is the deployment of the monitor 202, as previously described. As shown in FIGS. 5C and 5E, the unit 100 further includes a power button 112 to activate the unit 100 and directional buttons 114 adapted to toggle the unit 100 between the open position for use by the user and the closed position to deactivate and/or facilitate movement of the unit 100. FIG. 5D depicts the unit 100 in the open position and ready for operation by the user, as previously described.

In an alternate embodiment (not shown), the monitor is adapted to maintain a constant viewing position for the user. The monitor is preferably pivotably mounted to the upper housing to optimize viewing for the user.

FIGS. 6A-6C shows the use of the unit 100 by a user 10 of varying height (e.g., $5^{th}$ percentile or with hands about 710 mm measured from the floor, as in FIG. 6A; and $95^{th}$ percentile or with hands about 830 mm measured from the floor, as in FIG. 6B) including the user 10 in a chair or a wheelchair, shown in FIG. 6C, in accordance with a preferred embodiment of the present invention. One or more preferred embodiments of the present invention are adapted to accommodate users of different heights using the motorized lifting column 152. In one embodiment, the user engages the directional buttons to move the lifting column 152 (e.g., the inner portion 152b moves further away from, or outside of, the outer portion 152b) to adjust the height of the linkages 164 and/or the monitor 202 to accommodate the height of the user 10.

This concludes the description of presently preferred embodiments of the invention. The foregoing description has been presented for the purpose of illustration and is not intended to be exhaustive or to limit the invention to the precise form disclosed. Other modifications, variations and alterations are possible in light of the above teaching and will be apparent to those skilled in the art, and may be used in the design and manufacture of other embodiments according to the present invention without departing form the spirit and scope of the invention. It is intended the scope of the invention be limited not by this description but only by the claims forming a part hereof.

The invention claimed is:

1. A mobile rehabilitation apparatus for providing therapy to a user, the apparatus comprising:
   a base having one or more wheels;
   a mast assembly, projecting from the base, comprising a lower mast portion and an upper mast portion moveable relative to the lower mast portion, between a raised position and a collapsed position;
   a rehabilitation robot;
   a linkage associated with the upper mast portion and adapted for mounting the rehabilitation robot;
   a housing including a lower housing portion supported by the base and an upper housing portion supported by the upper mast portion, the lower housing portion having a compartment defined therein sized to accommodate the rehabilitation robot and the linkage when the robot is not in use; the upper housing portion being moveable relative to the lower housing portion between a stowage position wherein the upper housing portion rests proximate to the lower housing portion, and a deployment position wherein the upper housing portion is spaced apart from the lower housing portion;
   the mast assembly and the housing being configured to cooperate with each other such that:
      when the upper mast portion is in the raised position, the upper housing portion occupies the deployment position thereby forming a gap between the upper housing portion and the lower housing portion; the gap providing the user with access to the rehabilitation robot and permitting deployment of the rehabilitation robot; and
      when the upper mast portion is in the collapsed position, the upper housing portion occupies the stowage position thereby eliminating the gap closing off the compartment accommodating the rehabilitation robot and linkage.

2. The mobile rehabilitation apparatus of claim 1, wherein the linkage is moveable between a retracted position and an extended position, such that:
the linkage is wholly contained within the compartment in the retracted position; and
the linkage extends beyond the boundary of the compartment in the extended position.

3. The mobile rehabilitation apparatus of claim 2, wherein the movement of the linkage is perpendicular to the displacement of the upper housing portion.

4. The mobile rehabilitation apparatus of claim 2, wherein the linkage is a scissor mechanism.

5. The mobile rehabilitation apparatus of claim 2, wherein the linkage is motorized.

6. The mobile rehabilitation apparatus of claim 5, wherein the linkage comprises two motors positioned in a vertical arrangement.

7. The mobile rehabilitation apparatus of claim 6, wherein the two motors are supported by the upper mast portion using a cantilevered arrangement.

8. The mobile rehabilitation apparatus of claim 3, wherein the linkage comprises two motors positioned in a horizontal arrangement.

9. The mobile rehabilitation apparatus of claim 8, wherein the two motors are supported on a bottom surface by a platform extending from the upper mast portion.

10. The base of claim 1, further comprising a support extending away from a lower surface to maintain the apparatus in an upright position during use of the rehabilitation robot by the user.

11. The mast assembly of claim 1, wherein the upper mast portion is received within the lower mast portion in the collapsed position.

12. The mast assembly of claim 1, wherein the lower mast portion is received within the upper mast portion in the collapsed position.

13. The lower housing portion of claim 1, further comprising a stabilizer having a proximal portion and a distal portion, the proximal portion pivotally connected to the lower housing portion and the distal portion adapted to engage a surface when the rehabilitation robot is deployed to maintain the apparatus in an upright position during use of the rehabilitation robot by the user.

14. The stabilizer of claim 13, further comprising a switch operable to automatically induce a displacement of the upper mast portion, such that when the distal portion of the stabilizer engages the surface, the upper mast portion moves to the raised position and when the distal portion is disengaged from the surface, the upper mast portion moves to the collapsed position.

15. The upper housing portion of claim 1, further comprising a carry handle to facilitate transit of the apparatus when the upper mast portion is in the collapsed position.

16. The mobile rehabilitation apparatus of claim 15, further comprising a tilt bar projecting from the base, on a side of the apparatus proximal to the carry handle, to facilitate movement of the apparatus between an upright position and a tilted position for transit.

17. The mast assembly of claim 1, wherein the height of the upper mast portion in the raised position is adjustable depending on the height of the user.

18. The mobile rehabilitation apparatus of claim 1, further comprising a monitor for use by the user during deployment of the rehabilitation robot, the monitor attached to the upper housing portion by an articulated arm moveable between a monitor in-use position and a monitor stowage position.

19. The mobile rehabilitation apparatus of claim 18, wherein a top surface of the upper housing portion defines a monitor compartment sized to accommodate the monitor and the articulated arm when the monitor is in the stowage position.

20. The mobile rehabilitation apparatus of claim 1, wherein the mast assembly further comprises a motor to move the upper mast portion relative to the lower mast portion.

21. A mobile rehabilitation apparatus for providing therapy to a user, the apparatus comprising:
a base;
a mast assembly, projecting from the base, comprising a lower mast portion and an upper mast portion moveable relative to the lower mast portion, between a raised position and a collapsed position;
a rehabilitation robot connected to the upper mast portion;
a housing including a lower housing portion supported by the base and an upper housing portion supported by the upper mast portion, the lower housing portion having a compartment defined therein sized to accommodate the rehabilitation robot when the robot is not in use; the upper housing portion being moveable relative to the lower housing portion between a stowage position wherein the upper housing portion rests proximate to the lower housing portion, and a deployment position wherein the upper housing portion is spaced apart from the lower housing portion;
the mast assembly and the housing being configured to cooperate with each other such that:
when the upper mast portion is in the raised position, the upper housing portion occupies the deployment position thereby forming a gap between the upper housing portion and the lower housing portion; the gap providing the user with access to the rehabilitation robot and permitting deployment of the rehabilitation robot; and
when the upper mast portion is in the collapsed position, the upper housing portion occupies the stowage position thereby eliminating the gap closing off the compartment accommodating the rehabilitation robot.

22. A method of providing therapy to a patient at a patient location using a mobile rehabilitation apparatus:
(a) providing an apparatus having: a base; a mast assembly, projecting from the base, comprising a lower mast portion and an upper mast portion moveable relative to the lower mast portion, between a raised position and a collapsed position; a rehabilitation robot connected to the upper mast portion; a housing including a lower hosing portion supported by the base and an upper housing portion supported by the upper mast portion, the lower housing portion having a compartment defined therein sized to accommodate the rehabilitation robot when the robot is not in use; the upper housing portion being moveable relative to the lower housing portion between a stowage position wherein the upper housing portion rests proximate to the lower housing portion, and a deployment position wherein the upper housing portion is spaced apart from the lower housing portion;
(b) moving the apparatus, in the stowage position, to the patient location;
(c) moving the upper mast portion to the raised position to form a gap between the upper housing portion and the lower housing portion, the gap providing the patient with access to the rehabilitation robot and permitting deployment of the rehabilitation robot;
(d) providing therapy to the patient using the rehabilitation robot;
(e) moving the upper mast portion to the collapsed position to eliminate the gap closing off the compartment accommodating the rehabilitation robot; and
(f) moving the apparatus, in the stowage position, away from the patient location.

\* \* \* \* \*